(12) United States Patent
Zulauf et al.

(10) Patent No.: US 10,851,885 B2
(45) Date of Patent: Dec. 1, 2020

(54) PLANETARY TRANSMISSION

(71) Applicant: GUEDEL GROUP AG, Langenthal (CH)

(72) Inventors: Walter Zulauf, Ursenbach (CH); Christian Marie, Sarlat-la-Canéda (FR); Romain Bopp, Sarlat-la-Canéda (FR); Nicolas Laval, Campagnac-lġŕá és-Quercy (FR); Stefan Baumann, Aeschi (CH); Mathieu Amiet, Zuchwil (CH)

(73) Assignee: GUEDEL GROUP AG, Langenthal (CH)

( * ) Notice: Subject to any disclaimer, the term of this patent is extended or adjusted under 35 U.S.C. 154(b) by 0 days.

(21) Appl. No.: 16/308,091

(22) PCT Filed: Jun. 15, 2017

(86) PCT No.: PCT/EP2017/064703
§ 371 (c)(1),
(2) Date: Dec. 7, 2018

(87) PCT Pub. No.: WO2017/216306
PCT Pub. Date: Dec. 21, 2017

(65) Prior Publication Data
US 2019/0186613 A1    Jun. 20, 2019

(30) Foreign Application Priority Data

Jun. 16, 2016   (WO) ................. PCT/EP2016/063955

(51) Int. Cl.
*F16H 57/022*   (2012.01)
*F16H 19/04*    (2006.01)
*F16H 1/28*     (2006.01)

(52) U.S. Cl.
CPC ............. *F16H 57/022* (2013.01); *F16H 1/28* (2013.01); *F16H 19/04* (2013.01); *F16H 2057/0222* (2013.01); *F16H 2057/0224* (2013.01)

(58) Field of Classification Search
CPC ................. F16H 57/021; F16H 57/022; F16H 2057/0222; F16H 2057/0224; F16H 2057/0225; F16H 1/28; F16H 1/2863
See application file for complete search history.

(56) References Cited

U.S. PATENT DOCUMENTS 2,424,564 A    7/1947   Halbrook
4,158,317 A *  6/1979   James ...................... B62M 9/08
                                                      475/185

(Continued)

FOREIGN PATENT DOCUMENTS

DE   10 2004 055 743 A1   9/2005
DE   10 2009 006 482 A1   9/2010
EP        0 936 379 A2    8/1999

*Primary Examiner* — Jacob S. Scott
(74) *Attorney, Agent, or Firm* — Birch, Stewart, Kolasch & Birch, LLP

(57) ABSTRACT

A planetary transmission, comprising a housing, a drive part, an output part having an output shaft that is rotatable about an output axis of rotation, and at least one gear stage between the drive part and the output part. The drive part, the at least one gear stage, and the output part are mounted in the housing, the housing has an output flange on the output side, wherein the output flange has a first lateral surface with circularly symmetrical in radial planes about an axis of symmetry, wherein the first lateral surface is arranged eccentrically with respect to the output axis of rotation.

24 Claims, 9 Drawing Sheets

(56) References Cited

U.S. PATENT DOCUMENTS

| | | | |
|---|---|---|---|
| 5,097,718 A * | 3/1992 | Sahara | B23Q 5/56 384/255 |
| 6,364,803 B1 * | 4/2002 | Barnholt | F16H 48/08 475/246 |

* cited by examiner

PLANETARY TRANSMISSION

TECHNICAL FIELD

The invention relates to a planetary transmission, comprising a housing, a drive part, an output part having an output shaft which is rotatable about an output axis of rotation, and at least one gear stage between the drive part and the output part. The drive part, the at least one gear stage and the output part are mounted in the housing. The housing has an output flange on the output side, wherein the output flange has a first lateral surface with circular symmetry in radial planes about an axis of symmetry.

PRIOR ART

On account of their favorable properties, planetary transmissions of this type are used as step-up transmissions, superposition transmissions and manual transmissions in all regions of driving technology. This type of transmission has thus not only become established in vehicle manufacturing and shipbuilding, but also in general mechanical engineering and for stationary purposes when it depends on transmitting high powers and high torques in the event of a compact design.

Specific applications of such planetary transmissions are namely the driving of pinions which interact with racks in order to form a linear drive, and also the driving of pinions or pulleys for driving chains or belts. In the first case, in order to ensure reliable operation, the distance between the pinion and the dividing line of the rack has to be precisely adjusted. In the second case, the adjustability of the pinion or of the pulley serves for adjusting the chain or belt tension. In both cases, the adjustability can be realized by the pinion or the pulley being positioned together with the transmission and optionally the drive motor, which is arranged on the housing of the transmission.

Solutions are known in which the entire transmission is centered on and fastened to a machine-side adapter plate. Said adapter plate is subsequently fastened to the machine stand by means of (typically 4) fastening screws. Slots in the region of the fastening screws and a machine-side feed motion screw permit the radial infeed of the pinion to the dividing line of the rack—with the aim of play-free or low-play meshing. An analogous solution can be selected in the case of a pinion or a pulley, the position of which is intended to be adjustable along a line in order to adjust the chain or belt tension.

The company Wittenstein AG, Igersheim (Germany) supplies planetary transmissions, the housings of which have incorporated slots. The machine-side adapter plate is thus superfluous. The radial forces produced by the pinion are (similarly to the aforementioned solution) typically absorbed by a feed motion screw acting directly on the fastening flange.

The existing solutions are worthy of improvement with respect to the precise adjustment of the position and/or the supporting of the forces acting on the output.

DISCLOSURE OF THE INVENTION

It is an object of the invention to provide a planetary transmission which belongs to the technical field mentioned at the beginning, permits simple adjustment of the position of the output axis of rotation and permits secure support of the forces acting on the output.

The achievement of the object is defined by the features of claim 1. According to the invention, the first lateral surface is arranged eccentrically with respect to the output axis of rotation. The axis of symmetry of the lateral surface of the output flange and the axis of rotation of the output shaft therefore do not coincide.

The drive part is connected or connectable to a drive. The connection can take place directly, for example by a driveshaft of the drive acting directly on the drive part or forming a part thereof, or the connection takes place via further elements, for example a transmission shaft, a belt or a chain. The drive can accordingly be fastened directly to the planetary transmission or can be arranged separately therefrom.

The output part can be in the form of a fastening part, for example in the form of a fastening plate, for further components, for example a pinion, a pulley, etc. It can also directly include the further component.

The output flange serves to fasten and support the planetary transmission to and on a mounting element, for example a machine housing or a mounting plate. It can be formed integrally with the housing or as a separate component mounted on the housing. It can also consist of a plurality of components which are all separate components or are partially formed integrally with the housing of the planetary transmission.

Two applications of the transmissions are in the foreground: the driving of pinions which interact with racks in order to form a linear drive, and the driving of pinions or pulleys for driving chains or belts. In principle, however, the planetary transmission according to the invention can also be used for other applications.

Owing to the eccentricity of the lateral surface with respect to the output axis of rotation, rotation of the planetary transmission enables the component mounted on the output part (for example a pinion or a pulley) to be adjusted at maximum by twice the value of the eccentric. At the same time, the lateral surface of the output flange continues to have circular symmetry, which permits secure support on a mounting element when the latter is provided with a matching circular opening.

Since no linear slots are required in order to permit the adjustability, there is an ideal introduction of the forces into the machine-side structure. All of the radial forces which act on the planetary transmission from the output are dissipated directly in a form-fitting manner into the machine-side structure. The solution according to the invention is simultaneously compact and minimizes the structural outlay in the region in which the planetary transmission is accommodated.

In a first embodiment, the first lateral surface is circular-cylindrical. This permits mounting in a simply designed machine-side structure. The Z position of the transmission can be defined in a simple manner, for example by means of a stop. The precise adjustment can take place with the aid of correspondingly dimensioned plain washers.

In a second embodiment, the first lateral surface is in the shape of a portion of a circular cone. The transmission housing has to be assembled in such a manner that, rather than the torque which is produced by the transmission being able to set said transmission housing itself into rotation, the orientation (rotation) of the transmission, which has been found during the adjustment of the transmission position, can be reliably transmitted to the machine-side structure.

The transmission can take place by means of a frictional connection. In order to increase said frictional connection, in the second embodiment the lateral surface is now formed in the shape of a portion of a circular cone. Any axially produced forces of clamping systems greatly reinforce the security against rotation via the cone angle. Maximum security against rotation can therefore be achieved with a minimum number of clamping screws.

A cone angle of the first lateral surface is advantageously at least 10°, preferably significantly above 10°, for example 15° or more. This avoids self-locking and therefore considerably facilitates the handling.

A distance between the axis of rotation and the axis of symmetry is preferably 0.3-8.0 mm, in particular 0.3-4.0 mm. In the case of a first type of transmission permitting an infeed to a rack, this distance is, for example, 0.5 mm, and, in the case of drives intended to permit the tensioning of chains or belts, is, for example, 2.5 mm. In the case of a second type of transmission permitting an infeed to a rack, a relatively large eccentric is selected, in particular within the range of 1.8-7.0 mm, which permits complete disengagement of the pinion arranged on the planetary transmission from the rack.

Depending on the application, other distances and therefore other eccentricities are also possible.

The output flange advantageously has a plurality of arcuate axial slots arranged symmetrically with respect to the axis of symmetry, i.e. slots which extend in the axial direction through the flange. When correctly arranged, the slots permit the output flange to be fixed at a mounting opening of the machine frame. For this purpose, screws interact with corresponding threaded holes arranged regularly along the circumference of the mounting opening. They penetrate the slots, and the screw heads are supported on the output flange.

Instead of slots and screws penetrating the latter, other fastening solutions can be used. For example, use can be made of a clamping plate which reaches over the output flange and thus firmly clamps the latter on the machine frame. Instead of a clamping plate, use can also be made of a plurality of clamping segments which overlap the output flange in regions and are used for the secure clamping. The use of a plurality of segments is advantageous in particular in the event of limited space conditions.

In a preferred variant of the invention, the first lateral surface is formed in a first axial portion of the output flange, and a second lateral surface is formed in a second axial portion of the output flange, wherein the second lateral surface has circular symmetry about the output axis of rotation.

For the use of this variant of the planetary transmission, the installation opening is provided corresponding to the diameter of the lateral surface used. A geometry which releases the corresponding lateral surface with respect to the installation opening is provided for the other axial portion in each case.

This variant therefore permits both the use in applications in which a possibility of adjustment is required (for example for the infeed to a rack or the tensioning of chains or belts), and in applications in which a possibility of adjustment is not necessary, but precise centering is desired, namely in the case of spindle drives or the drive of ball-screw linear drives. The precise centering minimizes the loading of the coupling.

On account of the universal usability, the stock-keeping, even with respect to replacement parts, is simplified.

The second axial portion is preferably arranged on the drive side with respect to the first axial portion. The corresponding output-side arrangement of the second axial portion reduces the lever for dissipating radial forces in relation to applications in which the eccentric lateral surface of the output flange is used. These are applications which generally involve higher radial forces.

The output flange advantageously has a plurality of axial through holes arranged symmetrically with respect to the axis of rotation. These permit the secure fixing of the output flange in applications without a possibility of adjustment, when the output flange is held by its second portion in the mounting opening. The abovementioned slots and the through holes are preferably present, and therefore the optimum fastening possibility is provided in both application situations.

The first lateral surface is preferably formed on the outer ring of a tapered roller bearing. The latter forms a fixed bearing having a very narrow axial guide and is therefore very readily suited to the customary applications of the planetary transmission. A slender design arises by the formation of the lateral surface as an outer ring.

The second lateral surface is advantageously also formed on the outer ring of the tapered roller bearing. Secure support is therefore provided both during centric and during eccentric use.

In a first group of embodiments, the output flange is connected fixedly to the housing of the planetary transmission or is formed integrally therewith, and the eccentric first lateral surface is likewise arranged fixedly on the output flange and therefore on the housing. During the adjustment of the position of the output axis of rotation with the aid of the first lateral surface, the planetary transmission is then rotated together with the output flange about the (eccentric) axis of symmetry of the first lateral surface.

In the case of a second group of embodiments, the output flange has an annular element which is mounted rotatably on a lateral surface of the housing, wherein the first lateral surface is formed externally on the annular element. In this case, the housing of the planetary transmission comprises in particular a lateral surface which is centric with respect to the central axis of the transmission and the axis of rotation of the output element and is accommodated in a receiving opening which is eccentric with respect to the first lateral surface, which is formed on the annular element. By rotation of the annular element, the radial position of the output axis of rotation can therefore be changed. The rotational position of the transmission can be maintained here.

In a preferred embodiment from said second group, the output flange furthermore comprises a clamping ring by means of which the annular element can be clamped axially. As soon as the desired rotational position is set, the clamping ring can be fed in axially until the annular element is clamped between the clamping ring and a further element (in particular a mounting element such as, for example, a machine housing or a mounting plate). This results in security against rotation of the annular element and thereby against unintentional adjustment of the radial position of the output axis of rotation.

The clamping ring advantageously has at least one radial opening in order to permit rotational positioning of the annular elements with a tool. The annular element has, for example, radial bores in which the tool can engage in order to adjust the rotational position of the annular element and therefore the radial position of the output axis of rotation.

In another preferred embodiment from said second group, the output flange furthermore comprises, in addition to the annular element, a fastening ring and an adjustment screw, wherein a rotational position of the annular element relative to the fastening ring can be adjusted with the aid of the adjustment screw. The adjustment screw permits a delicate adjustment. By selection of a small thread pitch, it is ensured that the screw is self-locking at all torsional forces which occur. An additional fixing of the rotational position is therefore unnecessary.

In a further preferred embodiment, the planetary transmission comprises an annular clamping flange which is mounted rotatably, but captively, on the housing. The planetary transmission can therefore be supplied and used as an individual assembly. The clamping flange permits any desired rotation of the planetary transmission and therefore any desired adjustment of the radial position of the output axis of rotation, wherein angles of rotation of 180° (or more) are also readily possible. The clamping flange is fastened in particular via axial openings to a structure surrounding the mounting opening (for example by means of screws or other pin-like fastening elements). The rotational position of the planetary transmission can be fixed by tightening the fastening elements. For this purpose, the clamping flange interacts axially with a portion of the housing of the planetary transmission.

In order to mount the clamping flange captively on the housing, the clamping flange has elements which preferably project radially inward and interact with an encircling groove in a lateral surface of the output flange. The lateral surface is in particular a lateral surface which is eccentric to the first lateral surface, and the clamping flange is then fastened to the structure such that it surrounds the mounting opening symmetrically.

In preferred embodiments of the planetary transmission according to the invention, a distance between the output axis of rotation and the axis of symmetry of the first lateral surface amounts to at least 2.5% of the diameter of the output flange.

In a similar manner, a preferred embodiment of a linear system comprises
  a planetary transmission according to the invention,
  a pinion which is arranged on the output flange, and
  a rack for interaction with the pinion,
wherein a distance between the output axis of rotation and the axis of symmetry of the first lateral surface corresponds at least to the module of the rack, and is preferably at least 5% larger than the module of the rack.

A corresponding eccentricity makes it possible to completely disengage the pinion from the rack by rotation of the transmission by (approximately) 180°. The transmission can then be moved away along the rack—optionally with the structure to which said transmission is fastened. An eccentricity which is somewhat increased in relation to the minimum necessary for this purpose (for example of plus 5% or plus 10%) produces a certain margin of safety and permits an additional precise adjustment of the end position, for example to compensate for manufacturer tolerances at the components and for deviations in the installation positions of the components by the customer.

Alternatively, the eccentricity is significantly smaller, and therefore, although a pinion cannot be completely disengaged from a rack, precise adjustment to compensate for tolerances or positioning errors remains possible, however.

In particular in the case of planetary transmissions for relatively heavy drives, the adjustment of the position is facilitated if the output flange has an external toothing. The latter interacts with a pinion which can be mounted on the machine frame and permits the adjustment of the rotational position of the transmission (including attached drive motor).

In preferred variants of the planetary transmission according to the invention, the latter comprises a drive-side flange for the fastening of a drive, wherein the flange is arranged rotatably on the housing of the planetary transmission, and a rotational position of the flange relative to the housing can be fixed by means of clamping. The rotational position of the drive (for example of a motor) can thus be adjusted independently of the rotational position of the planetary transmission.

The attaching of a corresponding drive-side flange is not restricted to the planetary transmission according to the invention. It may also be expedient in the case of other planetary transmissions.

Further advantageous embodiments and combinations of features of the invention emerge in the detailed description below and the entirety of the patent claims.

BRIEF DESCRIPTION OF THE DRAWINGS

In the drawings used for explaining the exemplary embodiment.

In principle, identical parts are provided with the same reference signs in the figures.

WAYS OF IMPLEMENTING THE INVENTION

Figure 1:
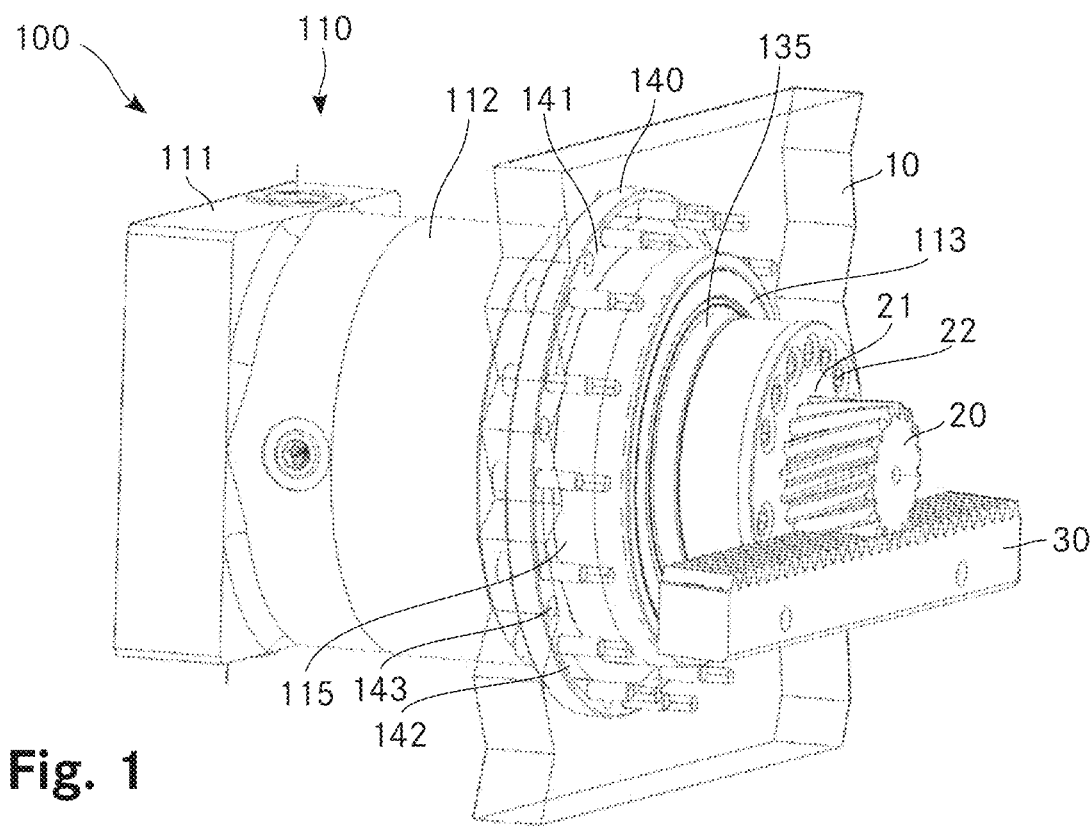
FIG. 1 shows an oblique view of a first embodiment of the planetary transmission according to the invention.
Figure 2:
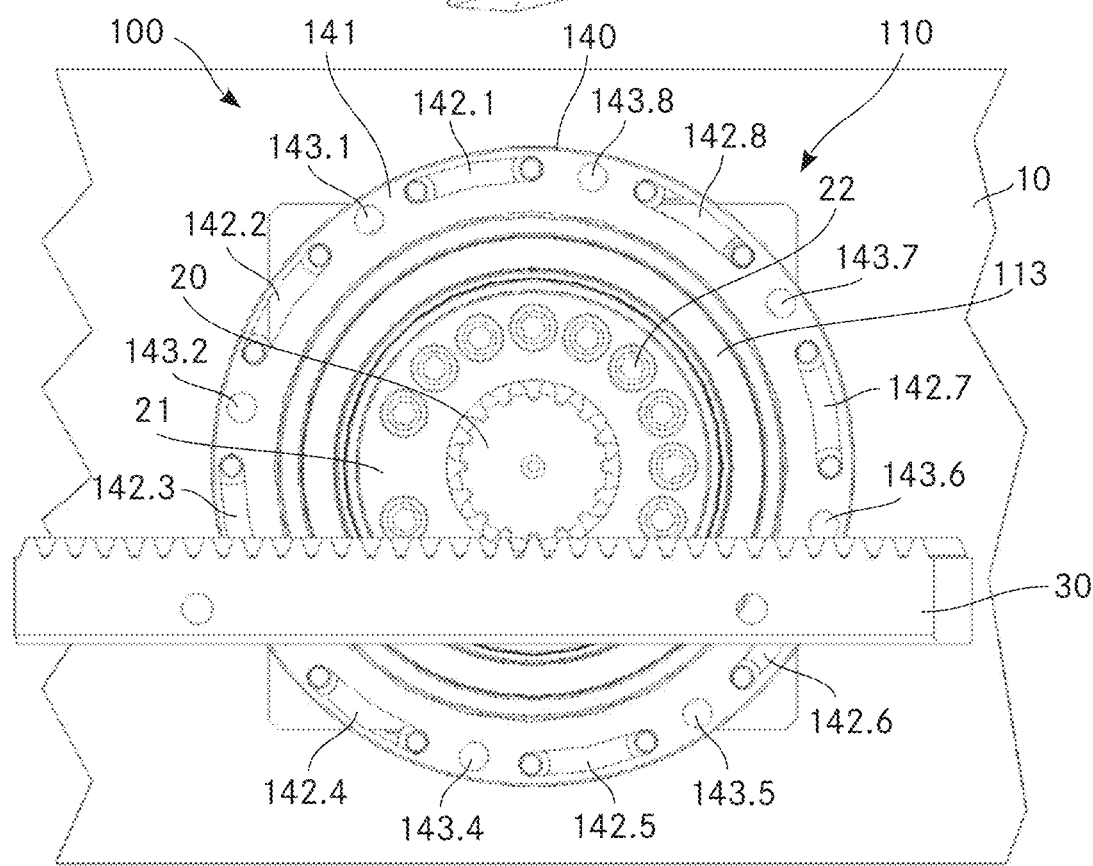
FIG. 2 shows a front view of the first embodiment.
Figure 3:
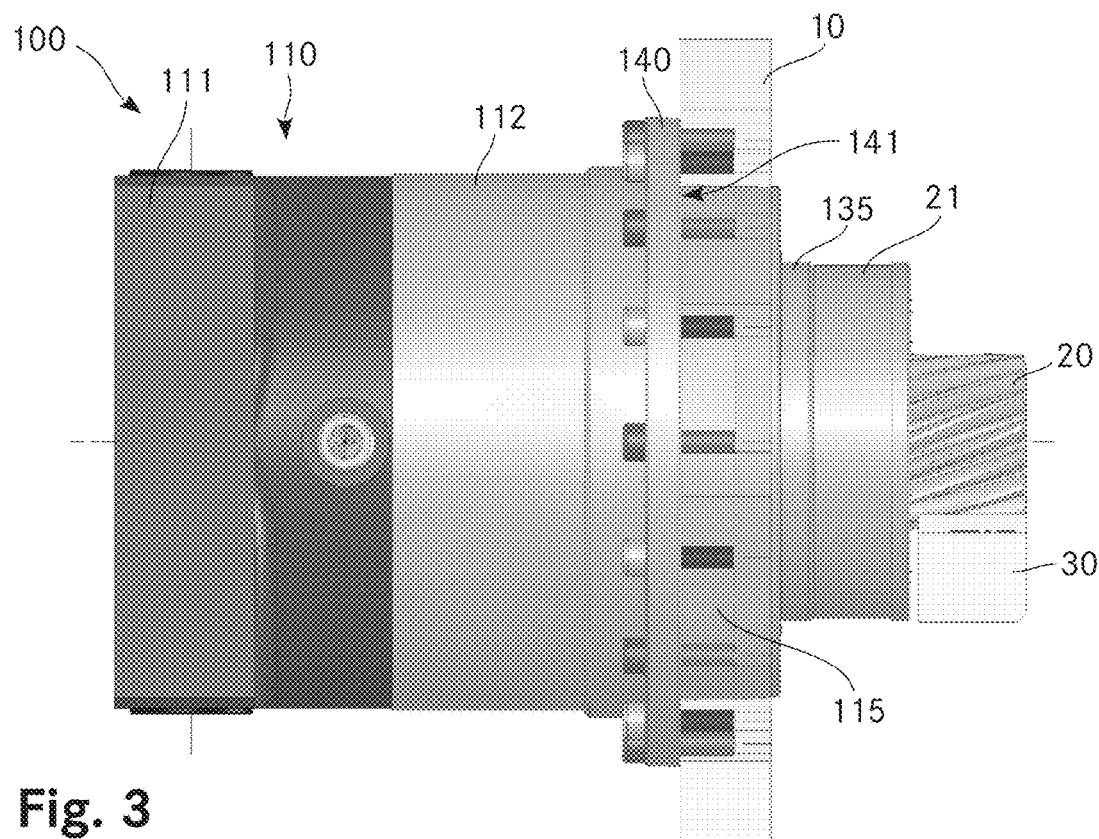
FIG. 3 shows a side view of the first embodiment.
Figure 4:
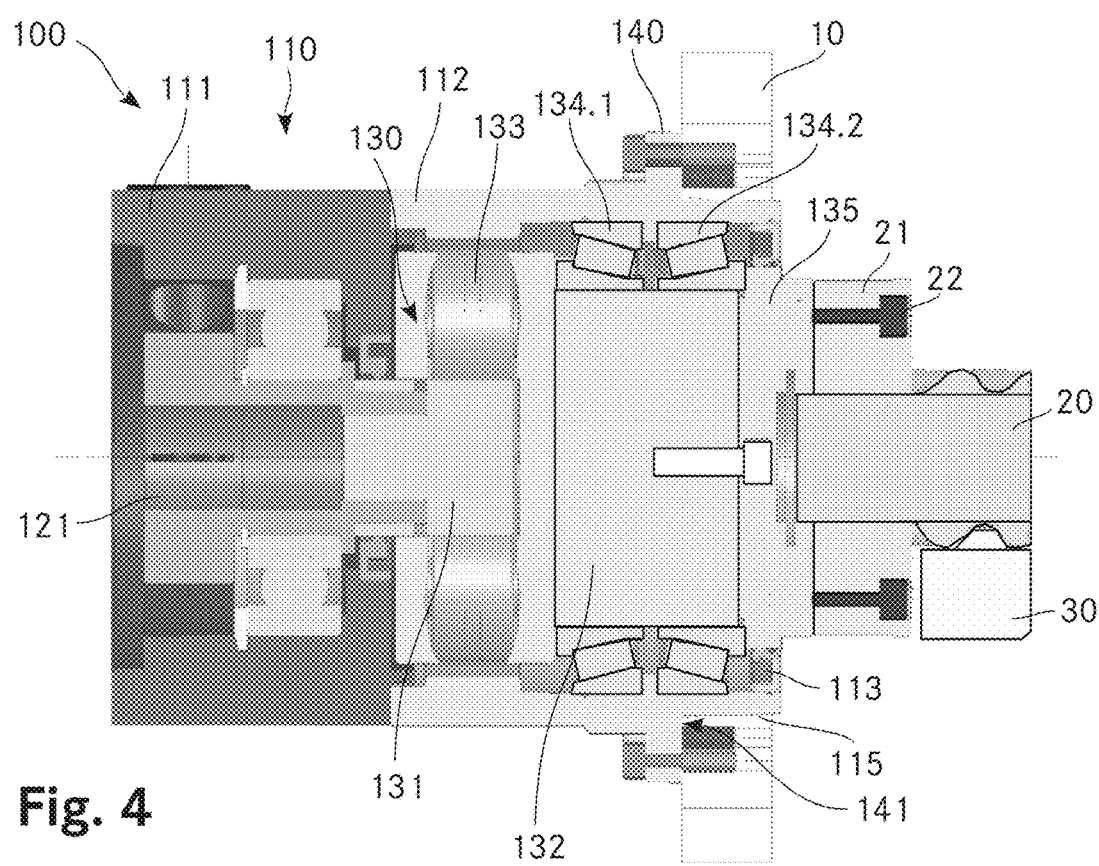
FIG. 4 shows a sectional image of the first embodiment.

FIGS. 1-4 show a first embodiment of a planetary transmission according to the invention: FIG. 1 is an oblique view, FIG. 2 a front view, FIG. 3 a side view, and FIG. 4 shows a sectional image along the central axis of the transmission.

The planetary transmission 100 is mounted in a mounting plate 10. The mounting plate 10 is, for example, part of a machine frame or of a machine housing. In the exemplary embodiment illustrated, a pinion 20 is fastened to the planetary transmission 100 on the output side. This pinion 20 interacts with a rack 30.

In a manner known per se, the planetary transmission 100 comprises a housing 110 with a drive-side housing part 111 and an output-side housing part 112 directly adjoining the latter. The drive-side housing part 111 has a rear (drive-side) portion having a substantially square cross section, and a front (output-side) portion having a substantially circular cross section. A coupling part 121 for receiving a motor shaft is accommodated in the drive-side housing part 111; the elements of the actual planetary transmission 130, namely the sun gear 131 connected to the coupling part 121 and the planet gears 133 arranged on the planet gear carrier 132, are accommodated in the output-side housing part 112. Corresponding planetary transmissions are known in general, and therefore a more detailed description of said components is unnecessary.

The planet gear carrier 132 is mounted on the output-side housing part 112 via two tapered roller bearings 134.1, 134.2 arranged in a mirror-inverted manner. A fastening plate 135 is arranged at the front end of the planet gear carrier 132. Said fastening plate has threaded openings spaced apart regularly in an encircling manner. Via said threaded openings, a holding plate 21 is fixedly connected on the end side to the fastening plate 135 by means of screws 22. The pinion 20 is fastened in the holding plate 21, for example is shrunk therein.

An annular seal 113 is accommodated between the fastening plate 135 and the output-side end of the output-side housing part 112. Said annular seal seals off the region of the tapered roller bearings 134.1, 134.2 towards the outside.

The planetary transmission 100 has, on its output-side housing part 112, an encircling, annular fastening flange 140 which is formed integrally therewith. Said fastening flange has a front (output-side) fastening surface 141 which is perpendicular to the central axis of the planetary transmission 100. The output-side housing part 112 also has a lateral surface 115 on the output side of the fastening flange 140. In the fastened state, the fastening surface 141 lies flat against the mounting plate 10 and therefore supports the planetary transmission 100 on the mounting plate 10. The lateral surface 115 is held in a manner fitting in a circular opening of the mounting plate 10 and therefore supports the planetary transmission in all directions against radial forces.

A plurality of axially continuous openings run in the fastening flange 140, namely eight uniformly arranged, arcuate slots 142.1 . . . 8 with a sector angle of 22.5° in each case, and also eight circular holes 143.1 . . . 8, which are each arranged centrally between the slots.

The fastening flange 140 with the slots 142 and the holes 143 and also the lateral surface 115 are formed eccentrically with respect to the central axis of the planetary transmission 100 and therefore the axis of rotation of the pinion 20, i.e. the lateral surface 115, the encircling edge of the fastening flange 140, the slots 142 and the holes 143 are arranged with circular symmetry with respect to an axis which is at a distance from the central axis of the planetary transmission 100 and therefore from the axis of rotation of the pinion 20. In the exemplary embodiment shown, the distance is 0.5 mm. This permits an adjustment of the distance of the pinion 20 with respect to the rack 30 by the planetary transmission 100 being rotated relative to the mounting plate 10 about the axis of symmetry of the fastening flange 140 or of the lateral surface 115.

Depending on the application, the planetary transmission 100 is fixed on the mounting plate 10 with the aid of the slots 142.1 . . . 8 and/or of the holes 143.1 . . . 8:

a) If an adjustment of the distance is desired, sixteen threaded openings spaced apart circularly and uniformly are provided in the mounting plate 10. By means of eight screws guided through the eight slots 142.1 . . . 8, the planetary transmission 100 can then be firmly clamped to the mounting plate 10 in all rotational positions, wherein, depending on the rotational position, a first or a second group of eight holes, which are each positioned at a distance of 45°, is used in the mounting plate 10. The planetary transmission is held in a form-fitting manner on the mounting plate 10 via the screw heads and the fastening flange 140 and supported against axial forces. Torsional forces are absorbed via the clamping between the screw heads and the rear surface of the fastening flange 140 or between the fastening surface 141 and the rear side of the mounting plate.

b) If no adjustment of the distance is desired, only eight threaded openings spaced apart circularly and uniformly have to be provided in the mounting plate 10. By means of eight screws guided through the eight holes 143.1 . . . 8, the planetary transmission 100 can then be fastened to the mounting plate 10 for rotation therewith in a manner known per se. Torsional forces are thus also absorbed by a form-fitting connection.

Figure 5:
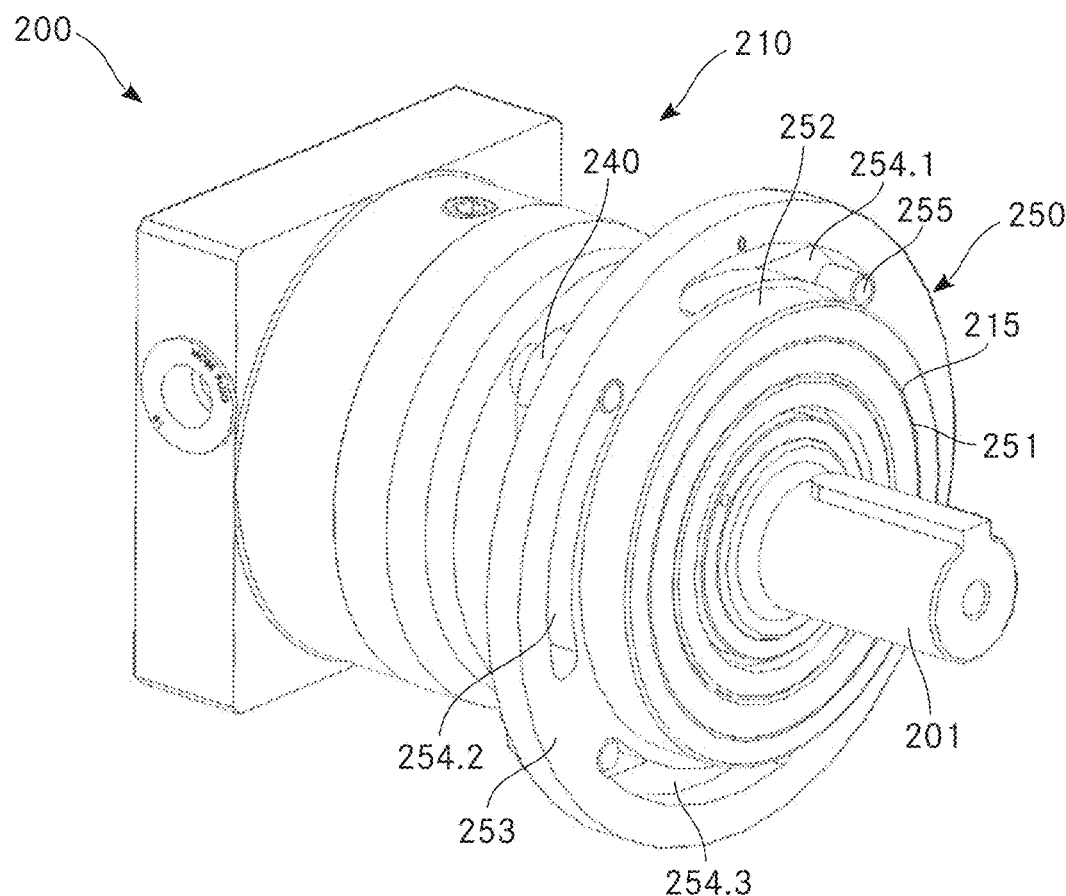
FIG. 5 shows an oblique view of a second embodiment of the planetary transmission according to the invention.

FIG. 5 is an oblique view of a second embodiment of the planetary transmission 200 according to the invention. This embodiment comprises a planetary transmission which is known per se and has a housing 210 which, on the output side, has a fastening flange 240 with four continuous, slot-like openings oriented parallel to the longitudinal axis of the planetary transmission. There is also a central lateral surface 215 on the output side of the fastening flange 240. In contrast to the first embodiment, a profiled output shank 201 is illustrated instead of an output-side pinion.

An eccentric flange 250 is now arranged as an additional element between the central lateral surface 215 of the planetary transmission, which is known per se, and a circular mounting opening in a mounting plate (not illustrated here). The eccentric flange 250 has a circular receiving opening 251, the cross section of which is matched to the lateral surface 215 of the planetary transmission.

In an encircling manner, the eccentric flange 250 in turn has a lateral surface 252 which is likewise circular, but is eccentric with respect to the receiving opening 251. The eccentricity is again 0.5 mm.

Adjoining the lateral surface 252 at the rear, the eccentric flange 250 has a fastening flange portion 253. The latter on the output side forms a front fastening surface which is perpendicular to the central axis of the planetary transmission 200. In the fastened state, said fastening surface lies flat against a mounting plate and therefore supports the planetary transmission 200 thereon. The lateral surface 252 is held in a manner fitting in a circular opening of the mounting plate and therefore supports the planetary transmission in all directions against radial forces. Four arcuate slots 254.1 . . . 4 which are arranged uniformly with a sector angle of 45° in each case run parallel to the central axis of the planetary transmission 200 in the fastening flange portion 253. Said slots are arranged symmetrically with respect to the center of rotation of the lateral surface 252.

The planetary transmission 200 is fixed to the mounting plate with the aid of the slots 254.1 . . . 4 and four screws 255 guided through the slot-like openings of the fastening flange 240. For this purpose, eight threaded openings spaced apart circularly and uniformly are provided in the mounting plate. The planetary transmission 200 can then be firmly clamped to the mounting plate in all rotational positions of the eccentric flange 250 by means of the four screws 255.

The geometry of the slot-like openings in the fastening flange 240 permits the radial movement of the planetary transmission that is necessary for the adjustment—in the simplest case, the openings have an extent which in all directions exceeds the cross section of the shank of the screws 255 used for the fastening. Via the screw heads and the fastening flange 240, the planetary transmission 200 is held in a form-fitting manner on the mounting plate and supported against axial forces. Torsional forces are absorbed via the clamping between the screw heads and the rear surface of the fastening flange 240, the front surface of the fastening flange 240, the two surfaces of the eccentric flange 250 and the rear side of the mounting plate.

In contrast to the first exemplary embodiment, if the planetary transmission 200 does not rotate during the infeed movement, but the end of the slots 254.1 . . . 4 is reached, the transmission has to be rotated by 45°, into the hole pattern, which is rotated by 45°, in the mounting plate.

Figure 6:
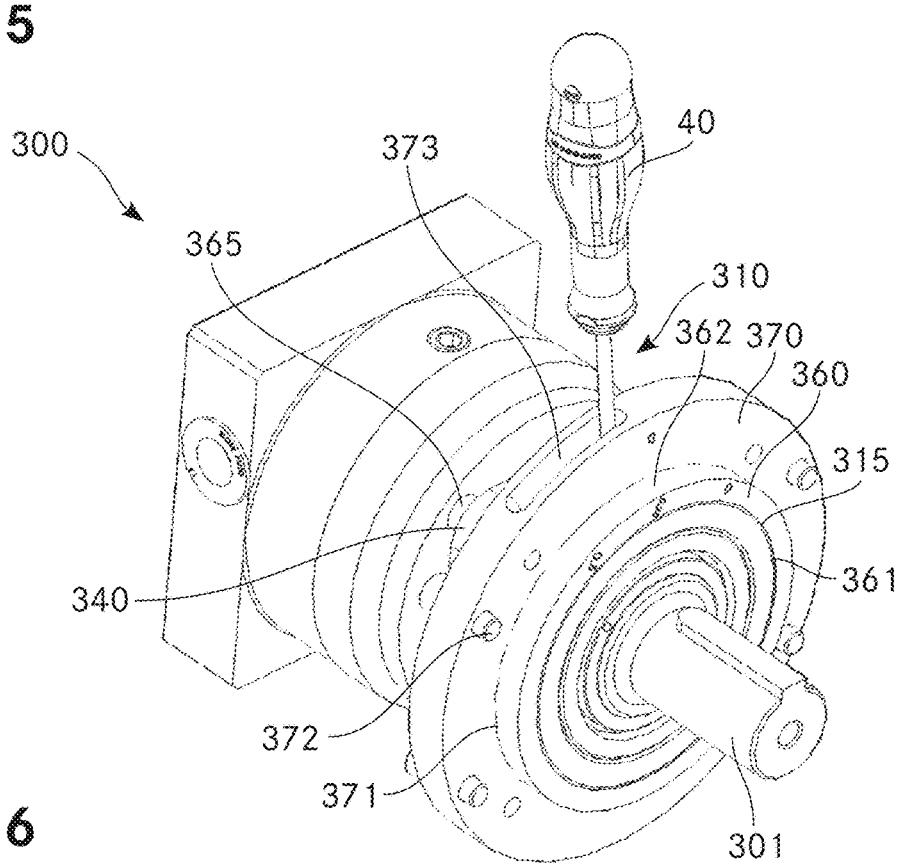
FIG. 6 shows an oblique view of a third embodiment of the planetary transmission according to the invention.

FIG. 6 is an oblique view of a third embodiment of the planetary transmission 300 according to the invention. As in the second embodiment, the latter comprises a planetary transmission which is known per se and has a housing 310 which, on the output side, has a fastening flange 340 with four continuous, slot-like openings oriented parallel to the longitudinal axis of the planetary transmission. There is likewise a central lateral surface 315 on the output side of the fastening flange 340, and there is also again a profiled output shank 301.

The planetary transmission 300 now has an eccentric sleeve 360 and a clamping flange 370 as additional elements. The eccentric sleeve 360 is arranged between the lateral surface 315 of the planetary transmission, which is known per se, and a circular mounting opening in a mounting plate (not illustrated here). The eccentric sleeve 360 has a circular receiving opening 361, the cross section of which is matched to the lateral surface 315 of the planetary transmission. In an encircling manner, the eccentric sleeve 360 for its part has a lateral surface 362 which is likewise circular, but is eccentric with respect to the receiving opening 361. The eccentricity is again 0.5 mm. At the rear end, an encircling web is formed on the lateral surface 362.

The clamping flange 370 is substantially annular and has a circular receiving opening 371, the cross section of which is matched to the outer geometry of the lateral surface 362 of the eccentric sleeve 360. The clamping flange is screwed to the fastening flange 340 of the planetary transmission by means of four screws 365. The geometry of the slot-like openings in the fastening flange 340 permits the movements taking place during the precise positioning (described further below) of the planetary transmission.

The clamping flange 370 has four further screw openings which are located in portions which are not covered by the fastening flange 340 of the planetary transmission and are therefore accessible from the rear. The clamping flange 370 and therefore the planetary transmission can be fastened to a mounting plate by means of four further screws 372. For this purpose, only four threaded openings are necessary in the mounting plate, the arrangement of which threaded openings corresponds to that of the four screw openings in the clamping flange 370.

The clamping flange 370 furthermore has a radially continuous slot 373 which permits direct access to a portion of the lateral surface 362 of the eccentric sleeve 360. The sector angle of the slot is 22.5°. A plurality of radial openings at a distance of 22.5° are arranged in the portion of the lateral surface 362. The rotational position of the eccentric sleeve 360 can be adjusted with the aid of a tool, for example a screwdriver 40, and said openings. If an opening reaches the end of the slot 373, it is possible to engage in the next opening. The eccentric sleeve 360 can thus be brought into any desired rotational position.

For the mounting of the planetary transmission 300, the procedure is as follows: first of all, the clamping flange 370 is fixed to the mounting plate by means of the screws 372. The planetary transmission is first of all fastened loosely to the clamping flange 370 at the fastening flange 340 via the four further screws 365. Subsequently, the rotational position of the eccentric sleeve 360 and therefore the position of the axis of rotation of the shank 301 is adjusted with the aid of the screwdriver 40 and of the radial openings in the eccentric sleeve 360.

If the desired position is reached, the screws 365 with which the planetary transmission is fastened to the clamping flange 370 are tightened. The eccentric sleeve 360 is thereby securely clamped via the web at the rear end of the lateral surface 362 between the fastening flange 340 of the planetary transmission and the clamping flange 370. The transmission itself is not rotated during the adjustment operation.

Figure 7:
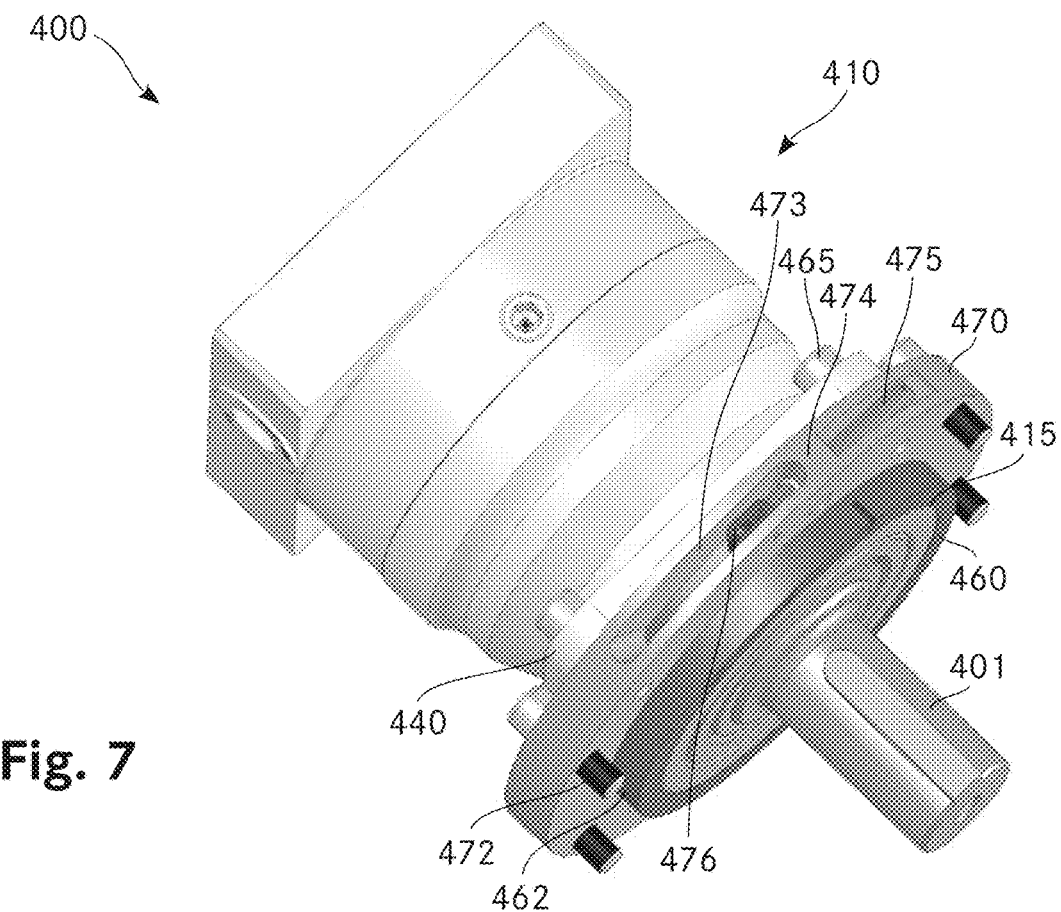
FIG. 7 shows a side view of a fourth embodiment of the planetary transmission according to the invention.

FIG. 7 is a side view of a fourth embodiment of the planetary transmission 400 according to the invention. As in the case of the second and third embodiment, said planetary transmission comprises a planetary transmission which is known per se and has a housing 410 which, on the output side, has a fastening flange 440 with four continuous, slot-like openings oriented parallel to the longitudinal axis of the planetary transmission. There is likewise a central lateral surface 415 on the output side of the fastening flange 440, and there is also again a profiled output shank 401.

The planetary transmission 400 again has an eccentric sleeve 460 and a clamping flange 470 as additional elements. The eccentric sleeve 460 is arranged between the lateral surface 415 of the planetary transmission, which is known per se, and a circular mounting opening in a mounting plate (not illustrated here). The eccentric sleeve 460 has a circular receiving opening, the cross section of which is matched to the lateral surface 415 of the planetary transmission. In an encircling manner, the eccentric sleeve 460 for its part has a lateral surface 462 which is likewise circular, but is eccentric with respect to the receiving opening. The eccentricity is again 0.5 mm. At the rear end, an encircling web is formed on the lateral surface 462.

The clamping flange 470 is substantially annular and has a circular receiving opening, the cross section of which is matched to the outer geometry of the lateral surface 462 of the eccentric sleeve 460. The clamping flange is screwed to the fastening flange 440 of the planetary transmission by means of four screws 465. The geometry of the slot-like openings in the fastening flange 440 permits the movements taking place during the precise positioning (described further below) of the planetary transmission.

The clamping flange 470 has four further screw openings which are located in portions which are not covered by the fastening flange 440 of the planetary transmission and are therefore accessible from the rear. The clamping flange 470 and therefore the planetary transmission can be fastened to a mounting plate by means of four further screws 472. For this purpose, only four threaded openings are necessary in the mounting plate, the arrangement of which threaded openings corresponds to that of the four screw openings in the clamping flange 470.

The clamping flange 470 furthermore has a radially continuous slot 473; its sector angle is approx. 80°. A transverse web 474 is formed in a central portion of the slot 473, with an axial circular opening running in said transverse web, the opening extending as far as the two end sides of the clamping flange 470. A bearing with a threaded opening is mounted rotatably in said opening. An adjustment screw 475 interacts with said threaded opening. Said adjustment screw comprises a threaded portion, at one end of which a slot is formed. An articulated head 476 is arranged at the other end, with a head part, in which the threaded portion freely rotates, and an articulated part which is pivotable relative to the head part about an axis running parallel to the longitudinal axis of the transmission. The articulated part engages in a radial opening in the lateral surface 462 of the eccentric sleeve 460.

The position of the adjustment screw 475 relative to the rotatable bearing can be adjusted with the aid of a screwdriver. The rotational position of the eccentric sleeve 460 and therefore the position of the axis of rotation of the shank 301 are therefore also adjusted. An adjustment distance of 90° is also permitted here.

Figure 8:
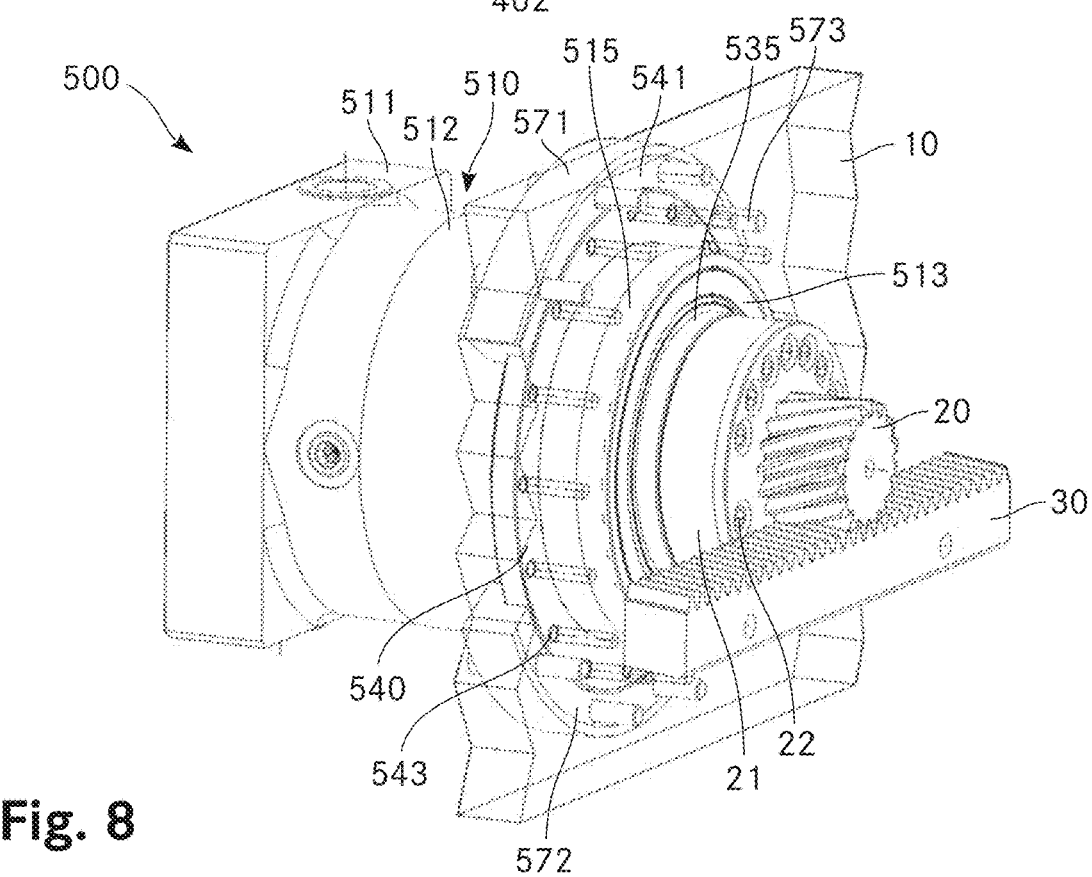
FIG. 8 shows an oblique view of a fifth embodiment of the planetary transmission according to the invention.

FIG. 8 is an oblique view of a fifth embodiment of the planetary transmission 500 according to the invention. It corresponds in a great many respects to the first embodiment.

The planetary transmission 500 is mounted in a mounting plate 10. The mounting plate 10 is, for example, part of a machine frame or of a machine housing. In the exemplary embodiment illustrated, a pinion 20 is fastened to the planetary transmission 500 on the output side. Said pinion 20 interacts with a rack 30.

In a manner known per se, the planetary transmission 500 comprises a housing 510 with a drive-side housing part 511 and an output-side housing part 512 directly adjoining the latter. The drive-side housing part has a rear (drive-side) portion having a substantially square cross section and a front (output-side) portion having a substantially circular cross section. A coupling part for receiving a motor shaft is accommodated in the drive-side housing part 511, and the elements of the actual planetary transmission are accommodated in the output-side housing part 512. Corresponding planetary transmissions are known in general, and therefore a more detailed description of said components is unnecessary. The mounting of the planet gear carrier via tapered roller bearings corresponds to that in the first embodiment.

A fastening plate 535 is arranged at the front end of the planet gear carrier. Said fastening plate has threaded openings spaced apart regularly in an encircling manner. Via said threaded openings, a holding plate 21 is fixedly connected on the end side to the fastening plate 535 by means of screws 22. The pinion 20 is fastened in the holding plate 21, for example is shrunk into the latter.

An annular seal 513 is accommodated between the fastening plate 535 and the output-side end of the output-side housing part 512. Said annular seal seals off the region of the tapered roller bearings toward the outside.

The planetary transmission 500 comprises, on its output-side housing part 512, an encircling, annular fastening flange 540 which is formed integrally therewith. Said fastening flange has a front (output-side) fastening surface 541 which is perpendicular to the central axis of the planetary transmission 500. In addition, the output-side housing part 512 has a lateral surface 515 on the output side of the fastening flange 540. In the fastened state, the fastening surface 541 lies flat against the mounting plate 10 and therefore supports the planetary transmission 500 on the mounting plate 10. The lateral surface 515 is held in a circular opening of the mounting plate 10 in a fitting manner and therefore supports the planetary transmission in all directions against radial forces. A plurality of axially continuous holes 543 is arranged in the fastening flange 540.

The fastening flange 540 and the lateral surface 515 are formed eccentrically with respect to the central axis of the planetary transmission 500 and therefore of the axis of rotation of the pinion 20, i.e. the lateral surface 515, the encircling edge of the fastening flange 540 and the holes 543 are arranged with circular symmetry with respect to an axis which is at a distance from the central axis of the planetary transmission 500 and therefore from the axis of rotation of the pinion 20. In the exemplary embodiment shown, the distance is 0.5 mm. This permits an adjustment of the distance of the pinion 20 from the rack 30 by the planetary transmission 500 being rotated relative to the mounting plate 10 about the axis of symmetry of the fastening flange 540 or of the lateral surface 515.

Furthermore, the planetary transmission 500 comprises two clamping segments 571, 572. The latter have an L-shaped cross section with two limbs which are perpendicular to each other and extend over a sector angle of approx. 120°. The cross-sectional geometry is designed in such a manner that the outer contour of the fastening flange 540 can be accommodated between the two limbs in a fitting manner. The two segments each comprise four axial through holes, and therefore they can be fastened to the mounting plate 10 with the aid of screws 573 which interact with correspondingly arranged threaded holes in the mounting plate 10.

The center lines of the two clamping segments 571, 572 are arranged at an angle of 90° with respect to the longitudinal axis of the rack 30 in order to absorb the radial forces of the meshing in the best possible manner.

Depending on the application, the planetary transmission 500 is fixed to the mounting plate 10 with the aid of the screws 573 and the two clamping segments 571, 572 or with the aid of the axial holes 543 in the fastening flange 540:
  a) If an adjustment of the distance is desired, 2×4 threaded holes are provided in the mounting plate, the arrangement of which threaded holes corresponds in each case to that of the through holes of one of the clamping segments 571, 572. The planetary transmission 500 can then be firmly clamped in all rotational positions to the mounting plate 10 by means of eight screws 573 guided through the through holes. Via the screw heads and the fastening flange 540, the planetary transmission is held in a form-fitting manner on the mounting plate 10 and is supported against axial forces. Torsional forces are absorbed via the clamping between the screw heads and the rear surface of the clamping segments 571, 572, between the radial limb of the clamping segments 571, 572 and the rear surface of the fastening flange 540 and between the fastening surface 541 and the rear side of the mounting plate.
  b) If no adjustment of the distance is desired, the axial holes 543 in the fastening flange 540 can serve for the fastening. A corresponding hole pattern is then required in the mounting plate 10. The clamping segments 571, 572 are not required in this case.

Figure 9:
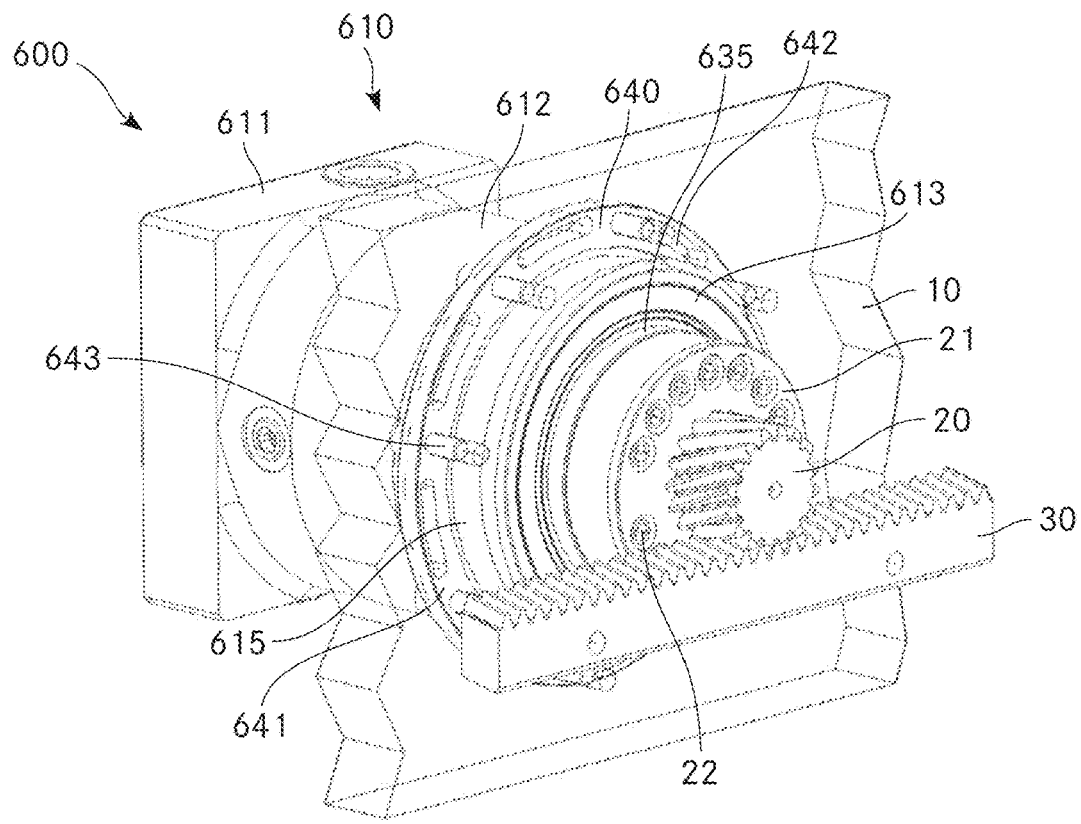
FIG. 9 shows an oblique view of a sixth embodiment of the planetary transmission according to the invention.
Figure 10:
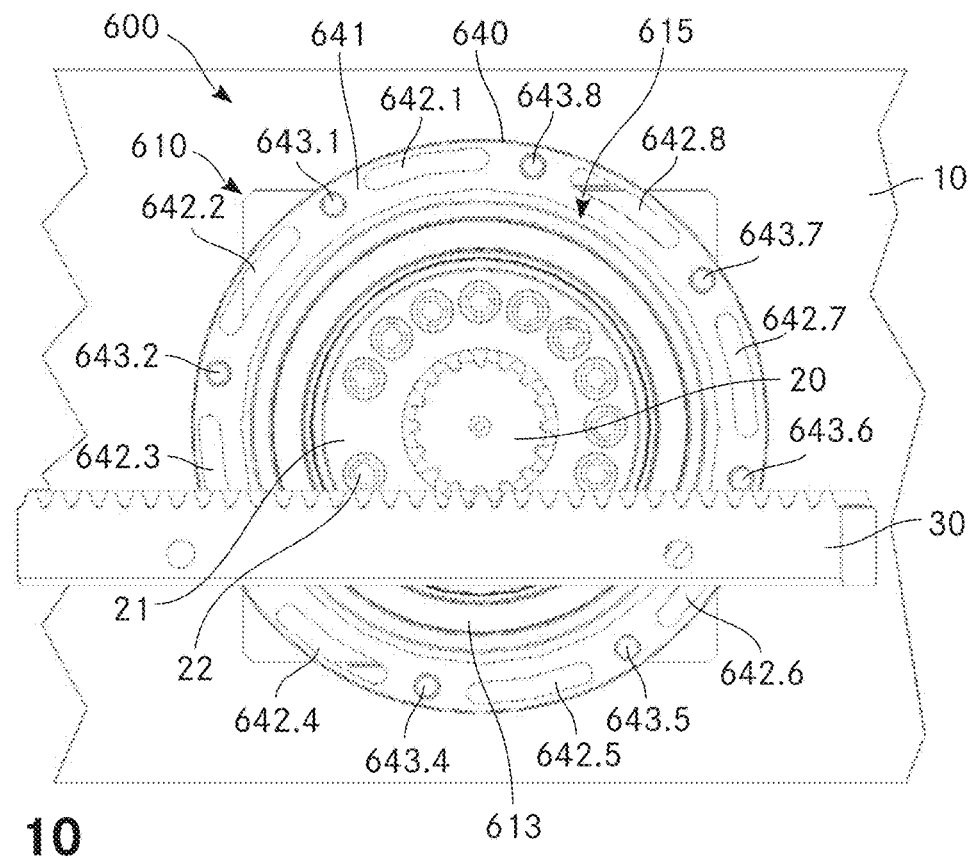
FIG. 10 shows a front view of the sixth embodiment.
Figure 11:
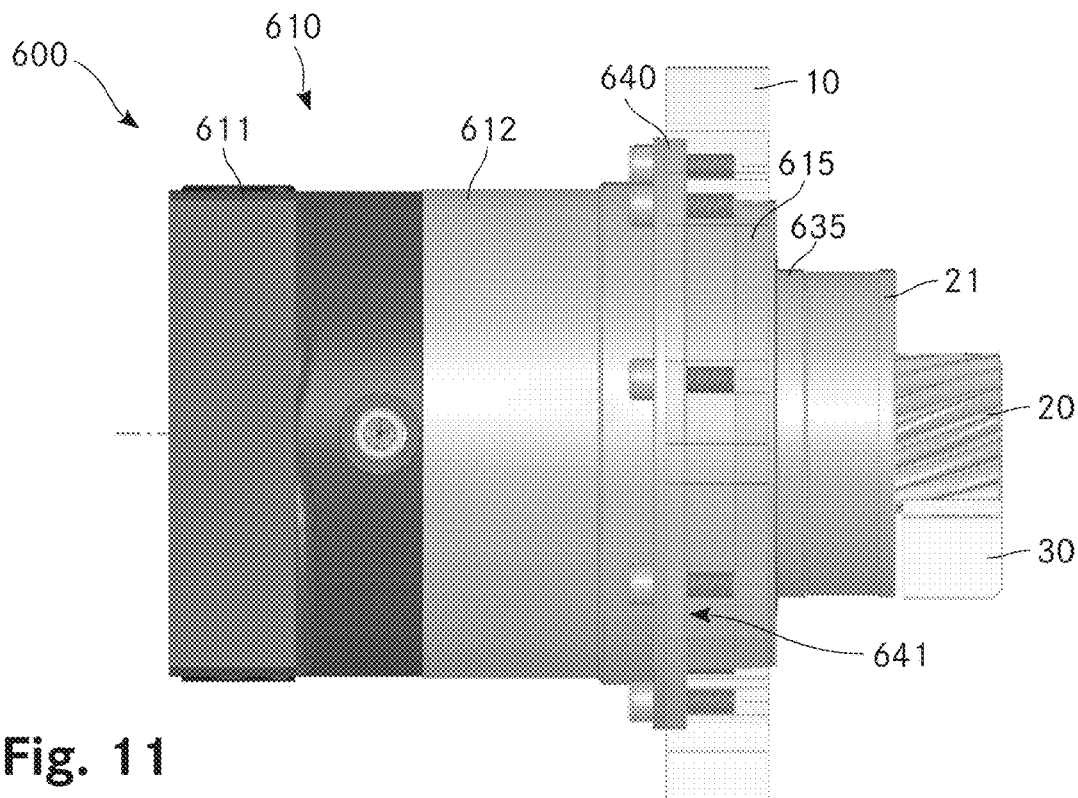
FIG. 11 shows a side view of the sixth embodiment.
Figures 12A, 12B:
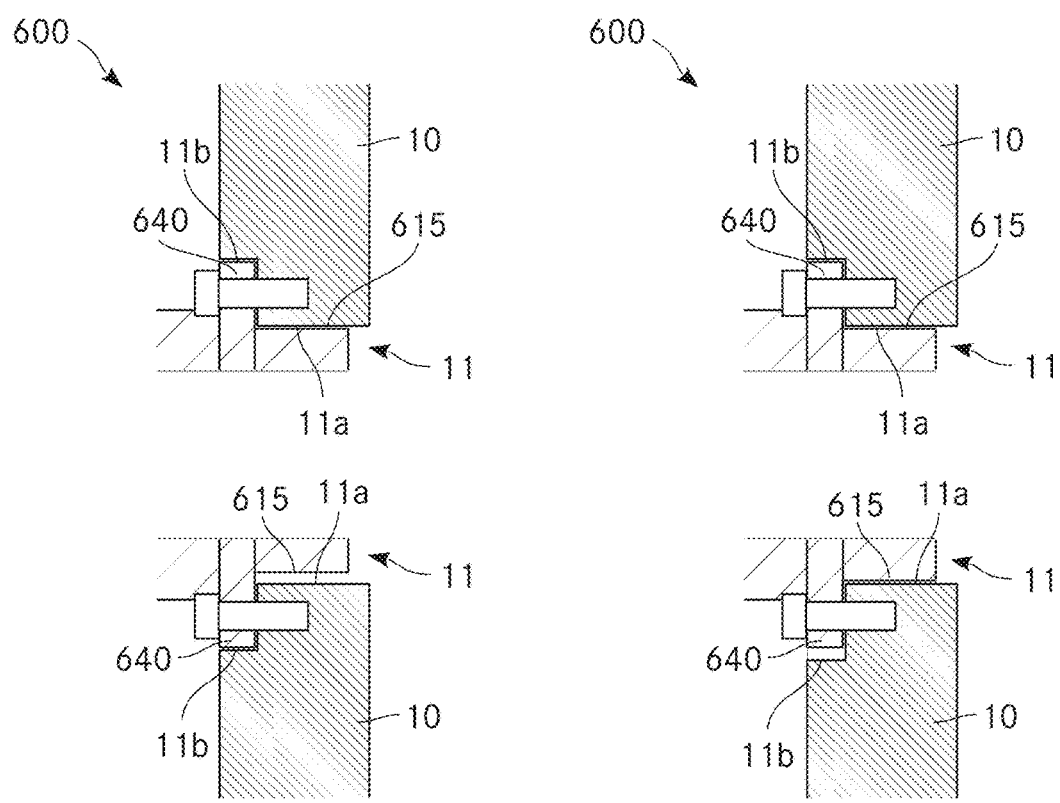
FIGS. 12A, B show sectional images of the sixth embodiment.

FIG. 9 is an oblique view of a sixth embodiment of the planetary transmission according to the invention, FIG. 10 shows a front view, FIG. 11 a side view and FIGS. 12A, B sectional images of a partial region, along the central axis of the transmission. The planetary transmission 600 corresponds in turn in a great many respects to the first embodiment.

The planetary transmission 600 is mounted in a mounting plate 10. The mounting plate 10 is, for example, part of a machine frame or of a machine housing. In the exemplary embodiment illustrated, a pinion 20 is fastened to the planetary transmission 600 on the output side. This pinion 20 interacts with a rack 30.

In a manner known per se, the planetary transmission 600 comprises a housing 610 with a drive-side housing part 611 and an output-side housing part 612 directly adjoining the latter. The drive-side housing part has a rear (drive-side) portion having a substantially square cross section, and a front (output-side) portion having a substantially circular cross section. A coupling part for receiving a motor shaft is accommodated in the drive-side housing part 611, and the elements of the actual planetary transmission are accommodated in the output-side housing part 612. Corresponding planetary transmissions are known in general, and therefore a more detailed description of said components is unnecessary. The mounting of the planet gear carrier corresponds to that in the first embodiment.

A fastening plate 635 is arranged at the front end of the planet gear carrier. Said fastening plate has threaded openings which are spaced apart regularly in an encircling manner. Via said threaded openings, a holding plate 21 is fixedly connected on the end side to the fastening plate 635 by means of screws 22. The pinion 20 is fastened in the holding plate 21, for example is shrunk therein.

An annular seal 613 is accommodated between the fastening plate 635 and the output-side end of the output-side housing part 612. Said annular seal seals off the region of the tapered roller bearings toward the outside.

The planetary transmission 600 comprises, on its output-side housing part 612, an encircling, annular fastening flange 640 which is formed integrally therewith. Said fastening flange has a front (output-side) fastening surface 641 which is perpendicular to the central axis of the planetary transmission 600. The output-side housing part 612 also has a lateral surface 615 on the output side of the fastening flange 640.

A plurality of axially continuous openings runs in the fastening flange 640, namely eight uniformly arranged arcuate slots 642.1 ... 8 with a sector angle of 22.5° in each case, and also eight circular holes 643.1 ... 8, which are each arranged centrally between the slots 642.1 ... 8.

The lateral surface 615 is formed eccentrically with respect to the central axis of the planetary transmission 600 and therefore to the axis of rotation of the pinion 20, i.e. the lateral surface 615 is arranged with circular symmetry with respect to an axis which is at a distance from the central axis of the planetary transmission 600 and therefore from the axis of rotation of the pinion 20. In the exemplary embodiment shown, the distance is 0.5 mm.

The slots 642 in the fastening flange 140 are arranged eccentrically in the same manner. By contrast, the fastening flange 640, namely its outer contour, and the holes 643 are formed centrally, i.e. in a rotationally symmetrical manner with respect to the central axis of the planetary transmission 600 and therefore with respect to the axis of rotation of the pinion 20.

The transmission can thus be used universally for applications requiring a radial infeed (for example rack drives, belt drives or chain drives), and for applications where a coaxial alignment of the output shaft with respect to the centering bore is of importance (spindle drives or for the direct attachment of process-specific rotation elements). Depending on the application, a differently configured opening is used in the mounting plate 10, the geometry of which opening is matched to the outer surface of the fastening flange 640 (for the central mounting) or of the lateral surface 615 (for the adjustable, eccentric mounting):

a) If an adjustment of the distance is desired, sixteen threaded openings spaced apart circularly and uniformly are provided in the mounting plate 10. The planetary transmission 600 can then be securely clamped in all rotational positions to the mounting plate 10 by means of eight screws guided through the eight slots 642.1 ... 8, wherein, depending on the rotational position, a first or a second group of in each case eight holes, positioned at a distance of 45°, is used in the mounting plate 10. Via the screw heads and the fastening flange 640, the planetary transmission is held in a form-fitting manner on the mounting plate 10 and is supported against axial forces. Torsional forces are absorbed via the clamping between the screw heads and the rear surface of the fastening flange 640 or between the fastening surface 641 and the rear side of the mounting plate.

b) If no adjustment of the distance is desired, only eight threaded openings spaced apart circularly and uniformly have to be provided in the mounting plate 10. The planetary transmission 100 can then be fastened in a manner known per se to the mounting plate 10 for rotation therewith by means of eight screws guided through the eight holes 643.1 ... 8. Torsional forces are thus also absorbed by a form-fitting connection.

The lateral surface 615 which, in variant a), is accommodated in the mounting plate 10 in a fitting manner is located closer to the output than the outer contour of the fastening flange 640 and can thus particularly readily absorb the significant radial forces anticipated in corresponding applications. In variant b), the (generally lower) radial forces are absorbed via the fastening flange 640, which is somewhat further away from the output.

FIGS. 12A, B show sectional images through that region in which the planetary transmission 600 is held in the mounting plate 10. The mounting plate 10 comprises an opening 11 for accommodating the planetary transmission 600. Said opening has a front (output-side) cylindrical boundary surface 11a and a rear (drive-side) cylindrical boundary surface 11b. The radius is greater in the region of the rear boundary surface 11b than in the region of the front boundary surface 11a.

In the situation which is shown in FIG. 12A and in which the planetary transmission 600 is held centrally, i.e. in a fixed position, in the mounting plate 10, the mounting plate 10 interacts in an encircling manner in the region of the rear boundary surface 11b with the outer side of the fastening flange 640. Radial forces acting on the planetary transmission 600 can therefore be absorbed irrespective of their direction directly by the mounting plate 10. In the region of the front boundary surface 11a, the radius is thus selected in such a manner that the lateral surface 615 of the planetary transmission 600 has space in the opening 11 irrespective of the rotational position. In the region of the front boundary surface 11a, the opening can be dimensioned in such a manner that, in one direction (at the top in FIG. 12A), the lateral surface 615 makes contact with the border, and therefore forces which act in said direction can also be transmitted in the region of the front boundary surface 11a to the mounting plate 10.

If large radial forces have to be absorbed, the opening 11 in the mounting plate 10 can be designed in such a manner that—in a predetermined rotational position of the planetary transmission 600—there is encircling contact even in the region of the lateral surface 615, i.e. the front and the rear boundary surfaces are formed eccentrically corresponding to the distance between the central axis of the planetary transmission 600 and the axis of rotation of the pinion.

In the situation which is shown in FIG. 12B and in which the planetary transmission 600 is held eccentrically in the mounting plate 10, i.e. adjustably with respect to a radial position of the axis of rotation of the output pinion, the mounting plate 10 interacts in an encircling manner in the region of the front boundary surface 11 a with the lateral surface 615 of the planetary transmission 600. Forces acting on the planetary transmission 600 can therefore be absorbed irrespective of their direction directly by the mounting plate 10. In the region of the rear boundary surface 11b, the radius is selected in such a manner that the outer surface of the fastening flange 640 has space in the opening 11 irrespective of the rotational position.

Figure 13:
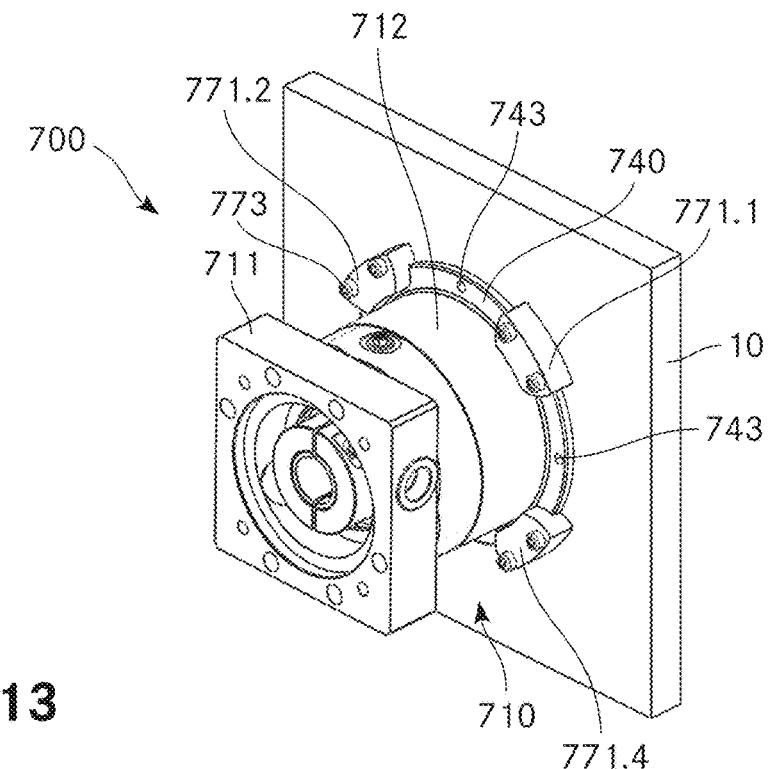
FIG. 13 shows an oblique view of a seventh embodiment of the planetary transmission according to the invention.
Figure 14A:
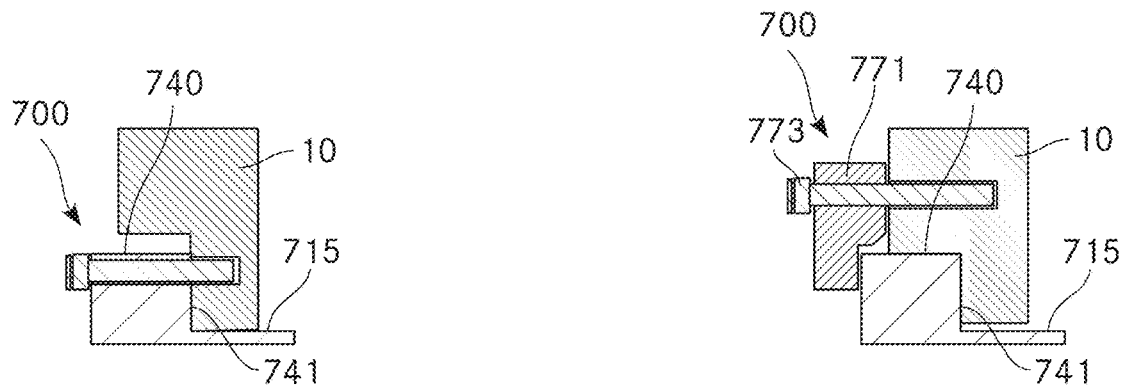
FIGS. 14A, B show sectional images of the seventh embodiment.
Figure 14A:
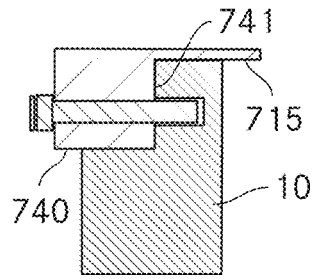

FIG. 13 is an oblique view of a seventh embodiment of the planetary transmission according to the invention. FIGS. 14A, B show sectional images of the seventh embodiment. The seventh embodiment corresponds in a great many respects to the fifth embodiment which has been described above in conjunction with FIG. 8.

The planetary transmission 700 is mounted in a mounting plate 10. The mounting plate 10 is, for example, part of a machine frame or of a machine housing. A pinion, for example, for interacting with a rack is fastened to the planetary transmission 700 on the output side.

In a manner known per se, the planetary transmission 700 comprises a housing 710 with a drive-side housing part 711 and an output-side housing part 712 directly adjoining the latter. The drive-side housing part has a rear (drive-side) portion with a substantially square cross section and a front (output-side) portion with a substantially circular cross section. A coupling part for accommodating a motor shaft is accommodated in the drive-side housing part 711, and the elements of the actual planetary transmission are accommodated in the output-side housing part 712. Corresponding planetary transmission are known in general, and therefore a more detailed description of these components is unnecessary. The mounting of the planet gear carrier via tapered roller bearings corresponds to that in the first embodiment.

The fastening of the pinion (or of other output elements) takes place as in the fifth embodiment and is therefore not described in more detail.

The planetary transmission 700 comprises, on its output-side housing part 712, an encircling, annular fastening flange 740 which is formed integrally therewith. Said fastening flange has a front (output-side) fastening surface 741 which is perpendicular to the central axis of the planetary transmission 700. In addition, the output-side housing part 712 has a lateral surface 715 on the output side of the fastening flange 740 (cf. FIGS. 14A, B). In the fastened state, the fastening surface 741 lies flat against the mounting plate 10 and therefore supports the planetary transmission 700 on the mounting plate 10. The lateral surface 715 is held in a circular opening of the mounting plate 10 in a fitting manner and therefore supports the planetary transmission in all directions against radial forces. A plurality of axially continuous holes 743 are arranged in the fastening flange 740.

The fastening flange 740 is formed eccentrically with respect to the central axis of the planetary transmission 700 and therefore the axis of rotation of the pinion, i.e. the encircling edge of the fastening flange 740 and the holes 743 are arranged with circular symmetry with respect to an axis which is at a distance from the central axis of the planetary transmission 700 and therefore from the axis of rotation of the pinion 20. In the exemplary embodiment shown, the distance is 0.5 mm. Upon fastening via the fastening flange 740, this permits an adjustment of the distance of the pinion from the rack by the planetary transmission 700 being rotated relative to the mounting plate 10 about the axis of symmetry of the fastening flange 740.

In contrast to the fastening flange 740, the lateral surface 715 is formed centrally with respect to the central axis of the planetary transmission 700 and therefore the axis of rotation of the pinion.

Furthermore, the planetary transmission 700 comprises four clamping claws 771.1 . . . 4 (of which three are visible in FIG. 13). Said clamping claws have an L-shaped cross section with two limbs which are perpendicular to each other, and each cover a sector angle of the fastening flange 740 of approx. 30°. The cross-sectional geometry is designed in such a manner that the outer contour of the fastening flange 740 can be accommodated between the two limbs in a fitting manner. All four clamping claws 771.1 . . . 4 each comprise two axial through holes, and therefore they can be fastened to the mounting plate 10 with the aid of screws 773 which interact with correspondingly arranged threaded holes in the mounting plate 10. The clamping claws 771.1 . . . 4 are arranged at an angular distance of 90° in each case with respect to one another. The result is a geometry in which the planetary transmission 700 and the four clamping claws 771.1 . . . 4 can be arranged on a square surface of the mounting plate 10, the side length of which only slightly exceeds the diameter of the fastening flange 740.

Figure 14B:
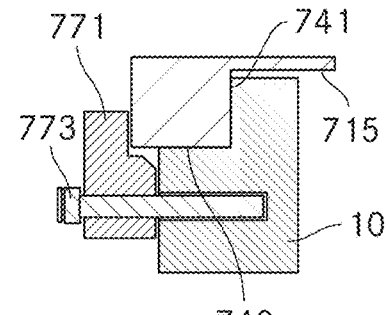

Depending on the application, the planetary transmission 700 is fixed to the mounting plate 10 with the aid of the screws 773 and the four clamping claws 771.1 . . . 4 or directly with the aid of the axial holes 743 in the fastening flange 740:

a) If an adjustment of the distance is desired, 4×2 threaded holes are provided in the mounting plate, the arrangement of which threaded holes in each case corresponds to that of the through holes of one of the clamping claws 771.1 . . . 771.4. The planetary transmission 500 can then be securely clamped in all rotational positions on the mounting plate 10 by means of eight screws 773 guided through the through holes. Via the screw heads and the fastening flange 740, the planetary transmission is held in a form-fitting manner on the mounting plate 10 and is supported against axial forces. Torsional forces are absorbed via the clamping between the screw heads and the rear surface of the clamping claws 771.1 . . . 4, between the radial limb of the clamping claws 771.1 . . . 4 and the rear surface of the fastening flange 740, and between the end-side fastening surface and the rear side of the mounting plate 10 (cf. FIG. 14B).

b) If no adjustment of the distance is desired, the axial holes 743 in the fastening flange 740 can serve for the fastening. A corresponding hole pattern is then required in the mounting plate 10. The clamping claws 771.1 . . . 4 cannot be used in this case. The output-side lateral surface 715 interacts here in an encircling manner with a fastening opening in the mounting plate 10 (cf. FIG. 14A).

Figure 15:
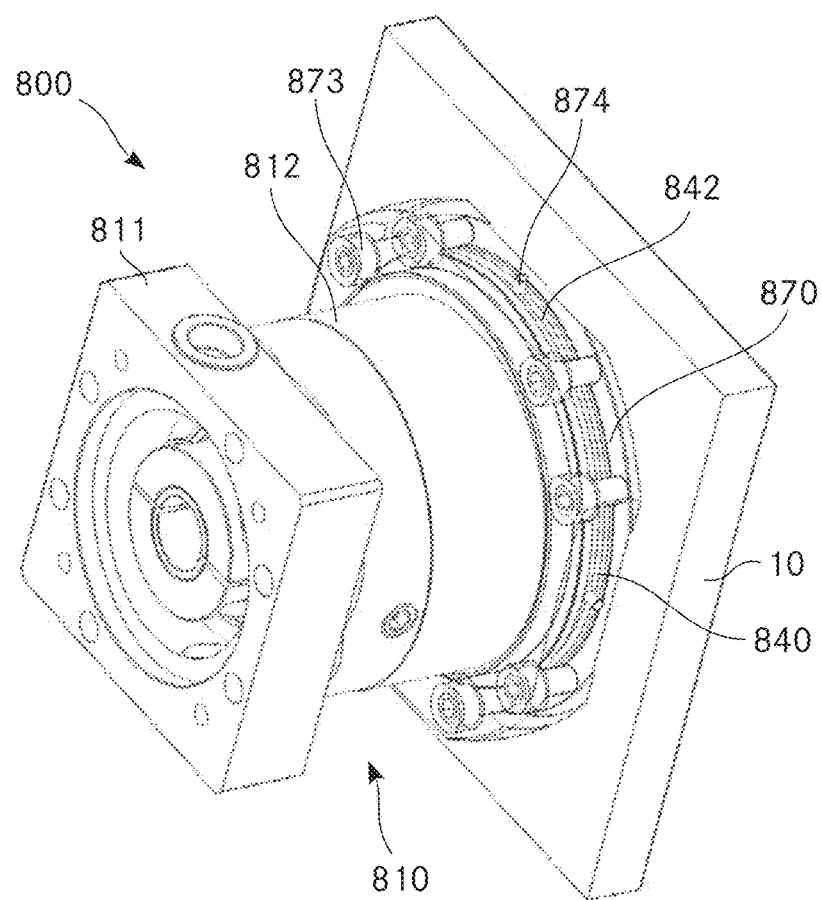
FIG. 15 shows an oblique view of an eighth embodiment of the planetary transmission according to the invention.
Figure 16:
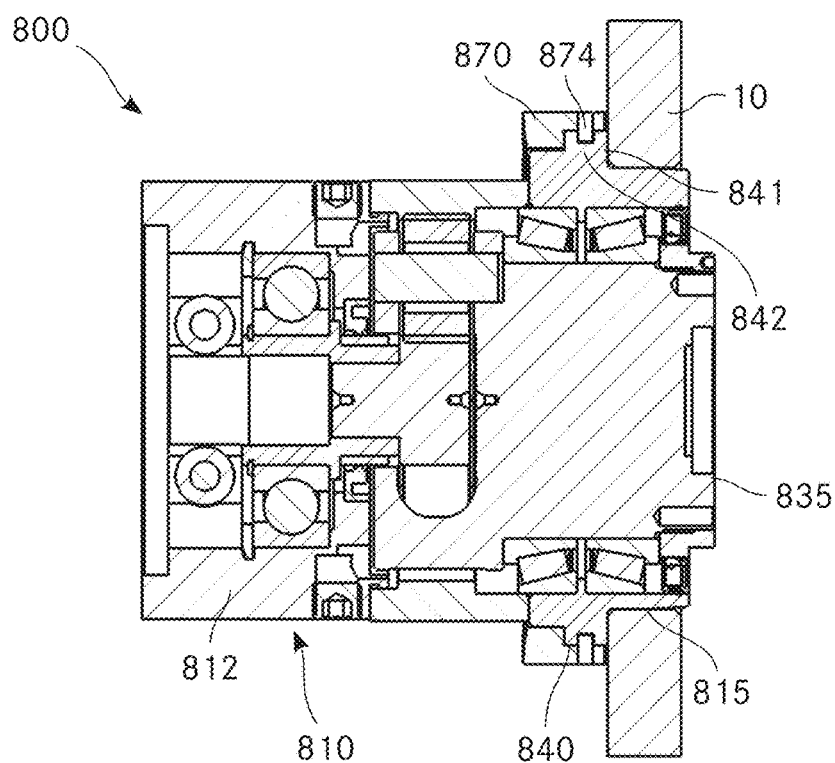
FIG. 16 shows a sectional image of the eighth embodiment.

FIG. 15 is an oblique view of an eighth embodiment of the planetary transmission according to the invention. FIG. 16 shows a sectional image of the eighth embodiment.

The planetary transmission 800 is mounted in a mounting plate 10. The mounting plate 10 is, for example, part of a machine frame or of a machine housing. A pinion, for example, for interacting with a rack is fastened to the planetary transmission 800 on the output side.

In a manner known per se, the planetary transmission 800 comprises a housing 810 with a drive-side housing part 811 and an output-side housing part 812 directly adjoining the latter. The drive-side housing part has a rear (drive-side) portion having a substantially square cross section, and a front (output-side) portion having a substantially circular cross section. A coupling part for receiving a motor shaft is accommodated in the drive-side housing part 811, and the elements of the actual planetary transmission are accommodated in the output-side housing part 812. Corresponding planetary transmission are known in general, and therefore a more detailed description of these components is unnecessary. The mounting of the planet gear carrier via tapered roller bearings corresponds to that in the first embodiment.

A fastening plate 835 is arranged at the front end of the planet gear carrier. Said fastening plate has threaded openings spaced apart regularly in an encircling manner. Via said threaded openings, a holding plate can be connected fixedly on the end side to the fastening plate by means of screws. The pinion is fastened in the holding plate, for example is shrunk therein. An annular seal is accommodated between the fastening plate and the output-side end of the output-side housing part. Said annular seal seals off the region of the tapered roller bearings toward the outside.

The planetary transmission 800 comprises, on its output-side housing part 812, an encircling, annular fastening flange 840 which is formed integrally therewith. Said fastening flange has a front (output-side) fastening surface 841 which is perpendicular to the central axis of the planetary transmission 800. In addition, the output-side housing part 812 has a lateral surface 815 on the output side of the fastening flange 840. In the fastened state, the fastening surface 841 lies flat against the mounting plate 10 and therefore supports the planetary transmission 800 on the mounting plate 10. The lateral surface 815 is held in a circular opening of the mounting plate 10 in a fitting manner and therefore supports the planetary transmission in all directions against radial forces.

The fastening flange 840 and the lateral surface 815 are formed eccentrically with respect to the central axis of the planetary transmission 800 and therefore the axis of rotation of the pinion, i.e. the lateral surface 815 and the encircling edge of the fastening flange 840 are arranged with circular symmetry with respect to an axis which is at a distance from the central axis of the planetary transmission 800 and therefore from the axis of rotation of the pinion. The distance depends on the dimensions of the planetary transmission. For various construction sizes, the following distances arise:

| Diameter mounting plate [mm] | Largest standard rack | Eccentric [mm] | Positional offset for mounting [mm] |
|---|---|---|---|
| 70 | Module 2 | 2.2 | 2.0 |
| 90 | Module 3 | 3.3 | 3.0 |
| 130 | Module 4 | 4.4 | 4.0 |
| 160 | Module 5 | 5.5 | 5.0 |
| 200 | Module 6 | 6.6 | 6.0 |

This permits an adjustment of the distance of the pinion from the rack by the planetary transmission 800 being rotated relative to the mounting plate 10 about the axis of symmetry of the lateral surface 815.

The planetary transmission 800 is fastened to the mounting plate 10 by means of a clamping flange 870 held captively on the planetary transmission 800. Said clamping flange is illustrated transparently in FIG. 15 for the sake of clarity. The clamping flange has a circular inner casing which surrounds the fastening flange 840. The inner cross section is substantially L-shaped, wherein an output-side portion has a larger inner diameter than a drive-side portion. The output-side portion interacts with the lateral surface of the fastening flange 840. On the outer side, the clamping flange 840 has four arcuate portions which are arranged uniformly along the circumference, extend over an angle of approx. 45° in each case and each have two through openings. Rectilinear portions run between the arcuate portions, and therefore a square surface is required on the mounting plate 10, the side length of which surface only slightly exceeds the outer diameter of the planetary transmission 800. The clamping flange 870 and therefore the planetary transmission 800 can be fastened to the mounting plate 10 via eight screws 873 running through the through openings.

In order to hold the clamping flange 870 on the planetary transmission 800, four radially oriented pins 874 are pressed into the clamping flange 870 at an angular distance of 90° in each case. Said pins interact with a groove 842 in the lateral surface of the fastening flange 840. This ensures that the clamping flange 870 is secured axially and is therefore held captively on the planetary transmission 800.

The end surface of the rear portion of the clamping flange 870 acts, on account of the material selection and geometry thereof, as an elastic element, in the manner of a disk spring. A predetermined securing force is thus produced. The effect thus achieved is that the front end side of the clamping flange 870 can rest flush on the surrounding structure of the mounting plate 10.

The relatively large eccentricity present according to the above table permits simplified mounting of the transmission, namely if a transmission is intended to already be preassembled during production. With conventional transmissions which bear a pinion which is intended to interact with a rack, it is often necessary to remove the planetary transmission before the final assembly so that the pinion can be disengaged from the rack and reengaged later. On account of the large eccentricity, the pinion in the planetary transmission according to the eighth embodiment can now be disengaged from the rack by rotation of the planetary transmission 800 by (virtually) 180°. For this purpose, the eight fastening screws 873 merely have to be slightly loosened.

The eccentricity value which is increased by 10% in relation to the module of the rack as before permits the compensation of manufacturing tolerances at the components and also the compensation of deviations in the rack mounting position by the customer during the precise adjustment in the final position. At the same time, it ensures sufficient clearance for the disengaged pinion and therefore permits the secure removal of the pinion from the rack.

In contrast to the previously described embodiments, in the case of the planetary transmission 800 according to the eighth embodiment, different products are used for central applications and for eccentric applications.

Figure 17:
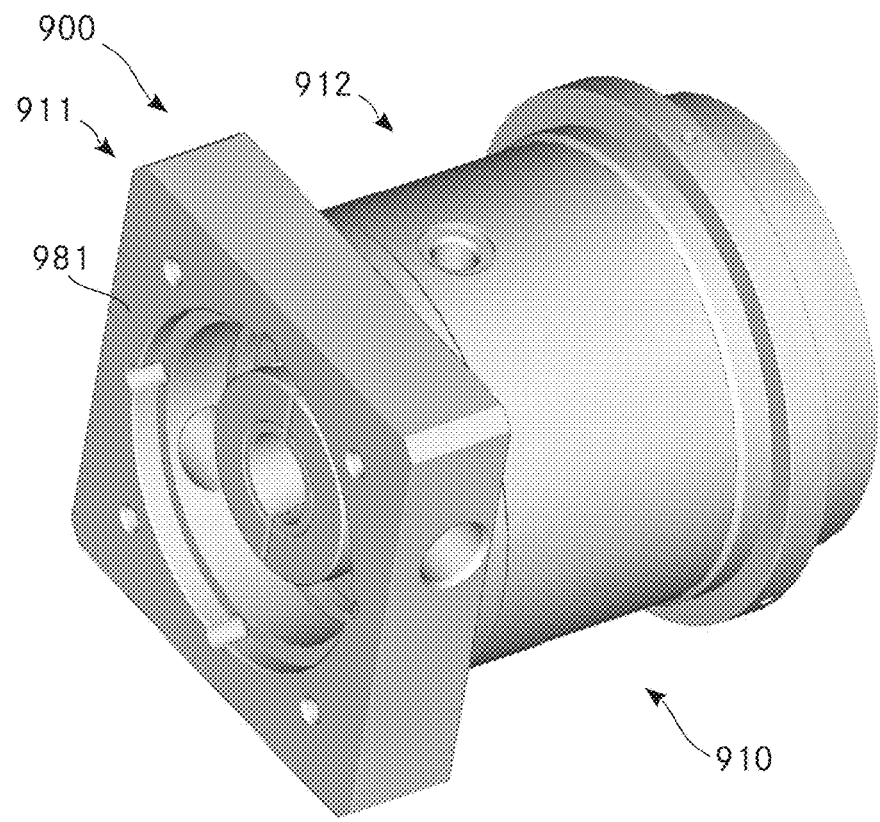
FIG. 17 shows an oblique view of a planetary transmission according to the invention with a motor fastening flange.
Figure 18:
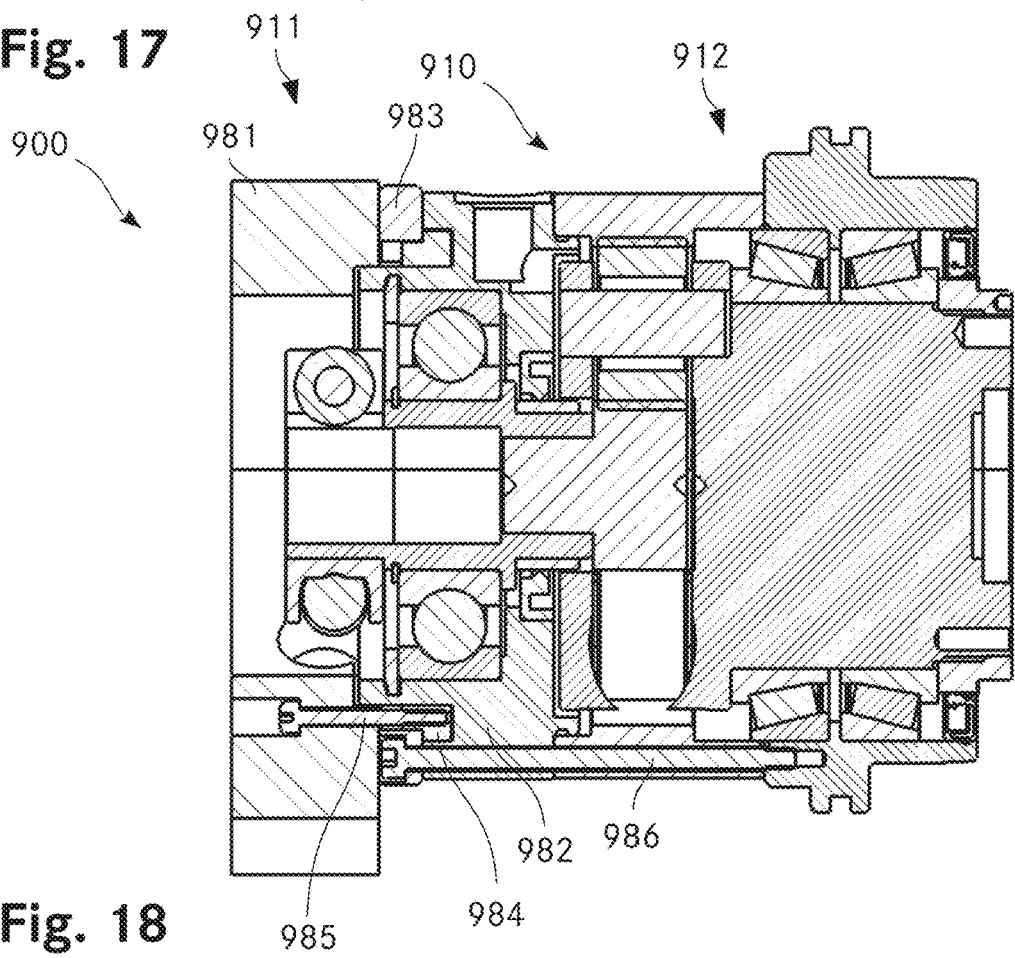
FIG. 18 shows a sectional image of the planetary transmission with a motor fastening flange.

FIG. 17 is an oblique view of a planetary transmission according to the invention with a motor fastening flange. FIG. 18 shows a sectional image of the planetary transmission with the motor fastening flange. The motor fastening flange can be used with all eight previously described embodiments. The planetary transmission 900 is therefore not described once again in conjunction with FIGS. 18 and 19; it again comprises a housing 910 with a drive-side housing part 911 and an output-side housing part 912 directly adjoining the latter.

The drive-side housing part 911 now comprises a fastening flange 981 for a motor. Said fastening flange has a square outer shape and comprises fastening elements for attaching the motor. It furthermore comprises a radial through opening for access to a clamping screw on the shaft of the planetary transmission 900.

The fastening flange 981 is connected to a rotary ring 984 by means of four screws 985. The rotary ring is arranged rotatably between a rear housing portion 982 of the drive-side housing part 911 and a supporting flange 983, wherein the supporting flange 983, the rear housing portion 982 and the further parts of the housing 910 of the transmission 900 are fastened to one another by means of a row of axial screws 986.

First of all, on account of the rotary ring 984, the fastening flange 981 is rotatable loosely in relation to the housing 910 of the transmission 900. If the four screws 985 are tightened, the fastening flange 981 is clamped in relation to the supporting flange 983 and fixes the rotational position. The contact surfaces can be formed conically in order to obtain an increased clamping force.

A corresponding planetary transmission 900 is mounted by the transmission first of all being fastened to the structure. When required, the adjustment already now also takes place by means of an eccentric (for example the adjustment of an output-side pinion). Next, the fastening flange 981 is aligned. In addition to the desired orientation of the motor, the position of the radial through opening on the fastening flange 981 should also be noted. The orientation obtained is fixed by tightening the screws 985. Subsequently, the motor is mounted on the fastening flange 981.

The orientation can be readjusted at any time, with the motor being removed in advance.

The invention is not restricted to the exemplary embodiments illustrated. Planetary transmissions shown above with pinions can namely also be formed with output shafts, and vice versa. The output shaft can also be designed, for example, as a hollow shaft or splined shaft. The output pinion can be directly integrated in the planet gear carrier. The motor can be mounted directly on the transmission or can be coupled to the transmission via a shaft, a belt drive or chain drive.

If the motor is mounted directly on the transmission, the drive-side housing part can have a fastening flange for the motor, which makes it possible for the motor to be fastened in different rotational positions. In variants in which the transmission housing rotates at the same time as the adjustment, a change in the rotational position of the motor can therefore be (at least partially) compensated for. This can namely be indicated because of the lines leading to the motor. In particular, the fastening flange permits the fastening of the motor in different rotational positions which are spaced apart in terms of angle, for example are each offset by 45°. For this purpose, a corresponding multiplicity of fastening holes and fastening screws are provided on the fastening flange of the transmission housing and on the motor.

The indicated eccentricity is understood merely as an example. The value of 0.5 mm is generally readily suitable for applications in which an output pinion has to be infed onto a rack. In applications in which sufficient tension of belts or chains has to be ensured, the eccentricity is generally selected to be greater and the distance between the axis of rotation and the rotational axis for adjusting the position is, for example, 2.5 mm.

In summary, it should be emphasized that the invention provides a planetary transmission which permits simple adjustment of the position of the output axis of rotation and permits a secure support of the forces acting on the output.

The invention claimed is:

1. A planetary transmission, comprising
   a) a housing;
   b) a drive part;
   c) an output part having an output shaft which is rotatable about an output axis of rotation;
   d) at least one gear stage between the drive part and the output part;
   wherein
   e) the drive part, the at least one gear stage and the output part are mounted in the housing;
   f) the housing has an output flange on the output side, wherein the output flange has a first lateral surface with circular symmetry in radial planes about an axis of symmetry;
   wherein the first lateral surface is arranged eccentrically with respect to the output axis of rotation, wherein a distance between the axis of rotation and the axis of symmetry is 0.3-8.0 mm$^1$.

2. The planetary transmission as claimed in claim 1, wherein the first lateral surface is circular-cylindrical.

3. The planetary transmission as claimed in claim 1, wherein the first lateral surface is in the shape of a portion of a circular cone.

4. The planetary transmission as claimed in claim 3, wherein a cone angle of the first lateral surface is at least 10°.

5. The planetary transmission as claimed in claim 1, wherein the output flange has a plurality of arcuate axial slots arranged symmetrically with respect to the axis of symmetry.

6. The planetary transmission as claimed in claim 1, wherein the first lateral surface is formed in a first axial portion of the output flange, and wherein a second lateral surface is formed in a second axial portion of the output flange, wherein the second lateral surface has circular symmetry about the output axis of rotation.

7. The planetary transmission as claimed in claim 6, wherein the second axial portion is arranged on the drive side with respect to the first axial portion.

8. The planetary transmission as claimed in claim 6, wherein the output flange has a plurality of axial through holes arranged symmetrically with respect to the axis of rotation.

9. The planetary transmission as claimed in claim 1, wherein the first lateral surface is formed on the outer ring of a tapered roller bearing.

10. The planetary transmission as claimed in claim 6, wherein the second lateral surface is formed on the outer ring of the tapered roller bearing.

11. The planetary transmission as claimed in claim 1, wherein the output flange has an annular element which is mounted rotatably on a lateral surface of the housing, wherein the first lateral surface is formed on the annular element.

12. The planetary transmission as claimed in claim 11, wherein the output flange furthermore comprises a clamping ring by means of which the annular element can be clamped axially.

13. The planetary transmission as claimed in claim 12, wherein the clamping ring has at least one radial opening in order to permit rotational positioning of the annular element with a tool.

14. The planetary transmission as claimed in claim 11, wherein the output flange furthermore comprises a fastening ring and an adjustment screw, wherein a rotational position of the annular element relative to the fastening ring can be adjusted with the aid of the adjustment screw.

15. The planetary transmission as claimed in claim 1, comprising an annular clamping flange which is mounted rotatably, but captively, on the housing.

16. The planetary transmission as claimed in claim 15, wherein the clamping flange has radially inwardly projecting elements which interact with an encircling groove in a lateral surface of the output flange.

17. The planetary transmission as claimed in claim 1, herein the output flange has an external toothing.

18. The planetary transmission as claimed in claim 1, comprising a drive-side flange for the fastening of a drive, wherein the flange is arranged rotatably on the housing of the planetary transmission, and a rotational position of the flange relative to the housing can be fixed by means of clamping.

19. A linear system, comprising
a planetary transmission as claimed in claim 1,
a pillion which is fastened to the planetary transmission on the output side, and
a rack for interaction with the pinion,
wherein a distance between the output axis of rotation and the axis of symmetry of the first lateral surface corresponds at least to the module of the rack.

20. The linear system as claimed in claim 19, wherein the distance between the output axis of rotation and the axis of symmetry of the first lateral surface is at least 5% larger than the module of the rack.

21. The planetary transmission as claimed in claim 1, wherein the distance between the axis of rotation and the axis of symmetry is 0.3-4.0 mm.

22. A planetary transmission comprising a drive-side flange for the fastening of a drive, wherein the flange is arranged rotatably on a housing of the planetary transmission for adjusting a rotational position of the fastened drive independently of a rotational position of the planetary transmission, and a rotational position of the flange relative to the housing can be fixed by a clamping.

23. A planetary transmission, comprising
a) a housing;
b) a drive part;
c) an output part having an output shaft which is rotatable about an output axis of rotation;
d) at least one gear stage between the drive part and the output part;
wherein
e) the drive part, the at least one gear stage and the output part are mounted in the housing;
f) the housing has an output flange on the output side, wherein the output flange has a first lateral surface with circular symmetry in radial planes about an axis of symmetry;
wherein the first lateral surface is arranged eccentrically with respect to the output axis of rotation, wherein a distance between the output axis of rotation and the axis of symmetry of the first lateral surface amounts to at least 2.5% of the diameter of the output flange.

24. A planetary transmission, comprising
a) a housing;
b) a drive part;
c) an output part having an output shaft which is rotatable about an output axis of rotation;
d) at least one gear stage between the drive part and the output part;
wherein
e) the drive part, the at least one gear stage and the output part are mounted in the housing;
f) the housing has an output flange on the output side, wherein the output flange serves to fasten and support the planetary transmission to and on a mounting element and has a first lateral surface with circular symmetry in radial planes about an axis of symmetry;
wherein the first lateral surface is arranged eccentrically with respect to the output axis of rotation, wherein owing to the eccentricity of the lateral surface with respect to the output axis of rotation, a rotation of the planetary transmission enables a component mounted on the output part to be adjusted at maximum by twice a value of the eccentric.

* * * * *